US010999765B2

(12) United States Patent
Livanos et al.

(10) Patent No.: US 10,999,765 B2
(45) Date of Patent: *May 4, 2021

(54) SYSTEM AND METHOD TO FACILITATE GROUP REPORTING OF USER EQUIPMENT CONGESTION INFORMATION IN A NETWORK ENVIRONMENT

(71) Applicant: Cisco Technology, Inc., San Jose, CA (US)

(72) Inventors: Konstantin Livanos, Naperville, IL (US); Ian McDowell Campbell, Bow Mar, CO (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/151,228

(22) Filed: Oct. 3, 2018

(65) Prior Publication Data
US 2019/0037445 A1 Jan. 31, 2019

Related U.S. Application Data

(63) Continuation of application No. 15/282,857, filed on Sep. 30, 2016, now Pat. No. 10,142,886.

(51) Int. Cl.
*H04W 28/08* (2009.01)
*H04W 28/02* (2009.01)
(Continued)

(52) U.S. Cl.
CPC ......... *H04W 28/08* (2013.01); *H04L 12/1407* (2013.01); *H04L 43/0882* (2013.01);
(Continued)

(58) Field of Classification Search
CPC .... H04W 28/08; H04W 4/24; H04W 28/0289
See application file for complete search history.

(56) References Cited

U.S. PATENT DOCUMENTS

| 5,432,907 A | 7/1995 | Picazo, Jr. et al. |
| 6,094,578 A | 7/2000 | Purcell et al. |

(Continued)

FOREIGN PATENT DOCUMENTS

| WO | 2012/038911 A1 | 3/2012 |
| WO | 2013/167190 A1 | 11/2013 |

(Continued)

OTHER PUBLICATIONS

European Office Action for Application No. 17 784 472.7-1215 dated Mar. 19, 2020.

(Continued)

*Primary Examiner* — Ronald B Abelson
(74) *Attorney, Agent, or Firm* — Patterson + Sheridan, LLP

(57) ABSTRACT

A method is provided in one example embodiment and may include receiving load information for a plurality of cells of a Radio Access Network (RAN); determining, for each of a plurality of user equipment (UE) in each cell, identification information for each UE and an Access Point Name (APN) to which each UE is connected; identifying, from a plurality of policy servers, each policy server that serves each APN to which each UE in each cell of the plurality of cells is connected; and sending, to each of a particular policy server, congestion information comprising: an identity for each cell having UE that are connected to each APN served by the particular policy server; the corresponding congestion level for each of the cells; and a per-cell UE list identifying each of a plurality of UE connected to each of APNs served by the particular policy server.

15 Claims, 4 Drawing Sheets

(51) Int. Cl.
*H04W 4/24* (2018.01)
*H04L 12/14* (2006.01)
*H04L 12/26* (2006.01)
*H04L 12/801* (2013.01)
*H04M 15/00* (2006.01)

(52) U.S. Cl.
CPC .............. *H04L 47/11* (2013.01); *H04L 47/14* (2013.01); *H04M 15/00* (2013.01); *H04M 15/66* (2013.01); *H04M 15/8027* (2013.01); *H04W 4/24* (2013.01); *H04W 28/0289* (2013.01)

(56) References Cited

U.S. PATENT DOCUMENTS

| | | | |
|---|---|---|---|
| 6,108,789 A | 8/2000 | Dancs et al. | |
| 6,185,205 B1 | 2/2001 | Sharrit et al. | |
| 6,233,315 B1 | 5/2001 | Reformato et al. | |
| 6,385,651 B2 | 5/2002 | Dancs et al. | |
| 6,745,246 B1 | 6/2004 | Erimli et al. | |
| 6,813,250 B1 | 11/2004 | Fine et al. | |
| 6,912,389 B2 | 6/2005 | Bright et al. | |
| 7,072,952 B2 | 7/2006 | Takehiro et al. | |
| 7,339,900 B2 | 3/2008 | Perlman | |
| 7,345,991 B1 | 3/2008 | Shabtay et al. | |
| 7,352,707 B2 | 4/2008 | Ho et al. | |
| 7,369,513 B1 | 5/2008 | Sankaran | |
| 7,460,492 B2 | 12/2008 | Portolani et al. | |
| 7,574,202 B1 | 8/2009 | Tsao et al. | |
| 7,685,295 B2 | 3/2010 | Myers et al. | |
| 7,724,656 B2 | 5/2010 | Sågfors et al. | |
| 8,065,480 B2 | 11/2011 | Panabaker et al. | |
| 8,089,963 B2 | 1/2012 | Melman et al. | |
| 8,112,330 B1 | 2/2012 | Grandcolas et al. | |
| 8,121,598 B2 | 2/2012 | Hamel et al. | |
| 8,130,655 B2 | 3/2012 | Foottit et al. | |
| 8,140,081 B2 | 3/2012 | Barrett et al. | |
| 8,194,556 B2 | 6/2012 | Tacconi et al. | |
| 8,208,933 B1 | 6/2012 | Talley et al. | |
| 8,335,161 B2 | 12/2012 | Foottit et al. | |
| 8,400,191 B2 | 3/2013 | Kimura et al. | |
| 8,724,467 B2 | 5/2014 | Le Faucheur et al. | |
| 9,560,549 B2 | 1/2017 | Speicher et al. | |
| 2002/0191572 A1 | 12/2002 | Weinstein et al. | |
| 2005/0118946 A1 | 6/2005 | Colban et al. | |
| 2005/0201406 A1 | 9/2005 | Sekine et al. | |
| 2005/0223111 A1 | 10/2005 | Bhandaru et al. | |
| 2005/0256969 A1 | 11/2005 | Yancey et al. | |
| 2006/0050667 A1 | 3/2006 | Verma et al. | |
| 2006/0199591 A1 | 9/2006 | Klatt | |
| 2006/0281471 A1 | 12/2006 | Shaffer et al. | |
| 2007/0183404 A1 | 8/2007 | Hofer | |
| 2008/0084822 A1 | 4/2008 | Sagfors et al. | |
| 2008/0095086 A1 | 4/2008 | Linkola et al. | |
| 2008/0101301 A1 | 5/2008 | Thomas et al. | |
| 2008/0155094 A1 | 6/2008 | Roese et al. | |
| 2008/0253342 A1 | 10/2008 | So et al. | |
| 2009/0005053 A1 | 1/2009 | Agin et al. | |
| 2009/0059795 A1 | 3/2009 | Fonseca, Jr. et al. | |
| 2009/0113069 A1 | 4/2009 | Prabhakar et al. | |
| 2009/0163216 A1 | 6/2009 | Hoang et al. | |
| 2009/0219888 A1 | 9/2009 | Chen et al. | |
| 2010/0075658 A1 | 3/2010 | Hou et al. | |
| 2010/0093351 A1 | 4/2010 | Barrett et al. | |
| 2010/0113032 A1 | 5/2010 | Lee et al. | |
| 2010/0113035 A1 | 5/2010 | Eskicioglu et al. | |
| 2010/0165960 A1 | 7/2010 | Richardson | |
| 2010/0208591 A1 | 8/2010 | Corliano et al. | |
| 2010/0232293 A1 | 9/2010 | Sagfors et al. | |
| 2010/0290398 A1 | 11/2010 | Choudhary et al. | |
| 2011/0021196 A1 | 1/2011 | Grayson et al. | |
| 2011/0039560 A1 | 2/2011 | Hratko et al. | |
| 2011/0082924 A1 | 4/2011 | Gopalakrishnan | |
| 2011/0105129 A1 | 5/2011 | Kim et al. | |
| 2011/0119740 A1 | 5/2011 | Grayson et al. | |
| 2011/0170408 A1 | 7/2011 | Furbeck et al. | |
| 2011/0194534 A1 | 8/2011 | Carmon et al. | |
| 2011/0267386 A1 | 11/2011 | Kurokawa et al. | |
| 2011/0299395 A1 | 12/2011 | Mariblanca Nieves | |
| 2011/0310740 A1* | 12/2011 | Ju ......................... H04W 28/10 |
| 2012/0051216 A1 | 3/2012 | Zhang et al. | |
| 2012/0096159 A1 | 4/2012 | Short et al. | |
| 2014/0011512 A1* | 1/2014 | Hu ......................... H04W 72/04 |
| 2015/0103664 A1* | 4/2015 | Shan ..................... H04L 12/801 |
| 2015/0156666 A1 | 6/2015 | Won et al. | |
| 2015/0382230 A1 | 12/2015 | Miklos et al. | |
| 2016/0029247 A1 | 1/2016 | Shan | |
| 2016/0073282 A1 | 3/2016 | Speicher et al. | |
| 2016/0269929 A1* | 9/2016 | Livanos ............ H04W 28/0289 |
| 2017/0013502 A1* | 1/2017 | Baniel ............... H04W 28/0289 |
| 2018/0098245 A1 | 4/2018 | Livanos et al. | |

FOREIGN PATENT DOCUMENTS

| | | |
|---|---|---|
| WO | 2014/175997 A1 | 10/2014 |
| WO | 2018064207 A1 | 4/2018 |

OTHER PUBLICATIONS

Notification of Transmittal of the International Search Report and the Written Opinion of the International Searching Authority, or the Declaration for Application No. PCT/US2017/053794 as dated Dec. 12, 2017.

Ericsson: "Message aggregation and routing on the Np interface", 3GPP Draft; 82-142358-NP-Aggregation. DA5, 3rd Generation Partnership Project (3GPP), Mobile Competence Centre; 650, Route Des Lucioles F-06921 Sophia-Antipolis Cedex; France• voL SA WG2, No. Dublin, Ireland; Jul. 7, 2014 Jul. 11, 2014 Jul. 2, 2014 (Jul. 2, 2014), XP050836804, Retrieved from the Internet: URL:http://www.3gpp_org/ftp/tsg sa/ NG2 Arc n/TSGS2 104 Dublin/Docs.

Adrangi, F., et al., Identity Selection Hints for the Extensible Authentication Protocol (EAP); RFC 4284; Jan. 2006; http://ietfreport.isoc.org/rfc/PDF/rfc4284.pdf; 15 pages.

Berry, B., et al., PPP Over Ethernet (PPoE) Extensions for Credit Flow and Link Metrics; RFC 4938; Jun. 2007; http://www.ietf.org/rfc/rfc4938.txt.pdf; 18 pages.

Broadband Forum, "TR-196 Femto Access Point Service Data Model," Issue 1; Issue Date: Apr. 2009; 131 pages.

Chandrasekhar, V. and J.G.Andrews, "Femtocell Networks: A Survey," The University of Texas at Austin; A. Gatherer, Texas Instruments; Jun. 28, 2008; 23 pages.

Kineto Wireless, Inc., "UMA: The 3GPP Standard for Femtocell-to-Core Network Connectivity," Aug. 2007; 9 pages.

Positron Public Safety Systems, "Product Specifications: Power RADIO," http://www.positron911.com/products/powerRADIO/powerRADIO_specs.asp, Dec. 18, 2008, 2 pages.

Thunder Eagle, Inc.—Radio Wireless Alerting Systems, "MRI-100™: Multi Radio Interface," http://www.thuneagle.com/mrilOO.htm, Dec. 18, 2008, 2 pages.

Wikipedia, "Distributed minimum spanning tree," http://en.wikipedia.org/wiki/Distributed_minimum_spanning_tree, Dec. 18, 2008, 2 pages.

Wikipedia, "Minimum spanning tree," http://en.wikipedia.org/wiki/Minimum_spanning_tree, Dec. 18, 2008, 5 pages.

Wikipedia, "Plectron," http://en.wikipedia.org/wiki/Plectron, Dec. 18, 2008, 2 pages.

Cisco Systems, Inc., "Chapter 11: Configuring Mobile PCC Support," Cisco Content Services Gateway 2nd Generation Release 4.0 Installation and Configuration Guide, Dec. 20, 2009; 8 pages.

ETSI TS 123 002 V13.6.0 (Jul. 2016) Technical Specification: Digital ellular telecommunications system (Phase 2+) (GSM); Universal Mobile Telecommunications System (UMTS); LTE; Network architecture (3GPP TS 23.002 version 13.6.0 Release 13); ETSI, 650 Route des Lucioles, F-06921 Sophia Antipolis Cedex—FRANCE, Jul. 2016; 114 pages.

3GPP TR 23.705 V13.0.0 (Dec. 2014) Technical Report: 3rd Generation Partnership Project; Technical Specification Group Ser-

(56) References Cited

OTHER PUBLICATIONS vices and System Aspects; Study on system enhancements for user plane congestion management (Release 13); Dec. 2014; 3GPP, 650 Route des Lucioles—Sophia Antipolis Valbonne—FRANCE, 61 pages.
3GPP TS 23.203 V14.0.0 (Jun. 2016) Technical Specification: 3rd Generation Partnership Project; Technical Specification Group Services and System Aspects; Policy and charging control architecture (Release 14), 3GPP, 650 Route des Lucioles—Sophia Antipolis Valbonne—FRANCE, Jun. 2016; 245 pages.
3GPP TS 23.401 V14.0.0 (Jun. 2016) Technical Specification: 3rd Generation Partnership Project; Technical Specification Group Services and System Aspects; General Packet Radio Service (GPRS) enhancements for Evolved Universal Terrestrial Radio Access Network (E-UTRAN) access (Release 14); 3GPP, 650 Route des Lucioles—Sophia Antipolis Valbonne—FRANCE, 374 pages.
3GPP TS 29.212 V14.0.0 (Jun. 2016) Technical Specification: 3rd Generation Partnership Project; Technical Specification Group Core Network and Terminals; Policy and Charging Control (PCC); Reference points (Release 14); 3GPP, 650 Route des Lucioles—Sophia Antipolis Valbonne—FRANCE, Jun. 2016; 258 pages.
3GPP TS 29.213 V14.0.0 (Jun. 2016) Technical Specification: 3rd Generation Partnership Project; Technical Specification Group Core Network and Terminals; Policy and Charging Control signalling flows and Quality of Service (QoS) parameter mapping (Release 14); 3GPP, 650 Route des Lucioles—Sophia Antipolis Valbonne—FRANCE, Jun. 2016; 223 pages.
3GPP TS 29.214 V14.0.0 (Jun. 2016) Technical Specification: 3rd Generation Partnership Project; Technical Specification Group Core Network and Terminals; Policy and Charging Control over Rx reference point (Release 14); 3GPP, 650 Route des Lucioles—Sophia Antipolis Valbonne—FRANCE, Jun. 2016; 73 pages.
3GPP TS 29.217 V13.4.0 (Jun. 2016) Technical Specification: 3rd Generation Partnership Project; Technical Specification Group Core Network and Terminals; Policy and Charging Control (PCC); Congestion reporting over Np reference point (Release 13); 3GPP, 650 Route des Lucioles—Sophia Antipolis Valbonne—FRANCE, Jun. 2016; 22 pages.
European Patent Office Examination Report for Application No. 17 784 472.7-1215 dated Oct. 29, 2020.

\* cited by examiner

100

RAN OAM SYSTEM 108

RCAF 110

DRA 130

SYSTEM AND METHOD TO FACILITATE GROUP REPORTING OF USER EQUIPMENT CONGESTION INFORMATION IN A NETWORK ENVIRONMENT

CROSS-REFERENCE TO RELATED APPLICATIONS

This application is a continuation of co-pending U.S. patent application Ser. No. 15/282,857, filed Sep. 30, 2016. The aforementioned related patent application is herein incorporated by reference in its entirety.

TECHNICAL FIELD

This disclosure relates in general to the field of communications and, more particularly, to a system and method to facilitate group reporting of user equipment congestion information in a network environment.

BACKGROUND

Networking architectures have grown increasingly complex in communications environments, particularly mobile wireless environments. Mobile communication networks have grown substantially in subscriber base as end users become increasingly connected to mobile wireless environments. As the number of mobile subscribers increases, efficient management of communication resources becomes more critical. In some instances, congestion in a network can cause network resources to become overloaded and can result in degraded user experience. Accordingly, there are significant challenges in managing network resources, particularly when congestion occurs in the network.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DESCRIPTION OF EXAMPLE EMBODIMENTS

Overview

Figure 1:
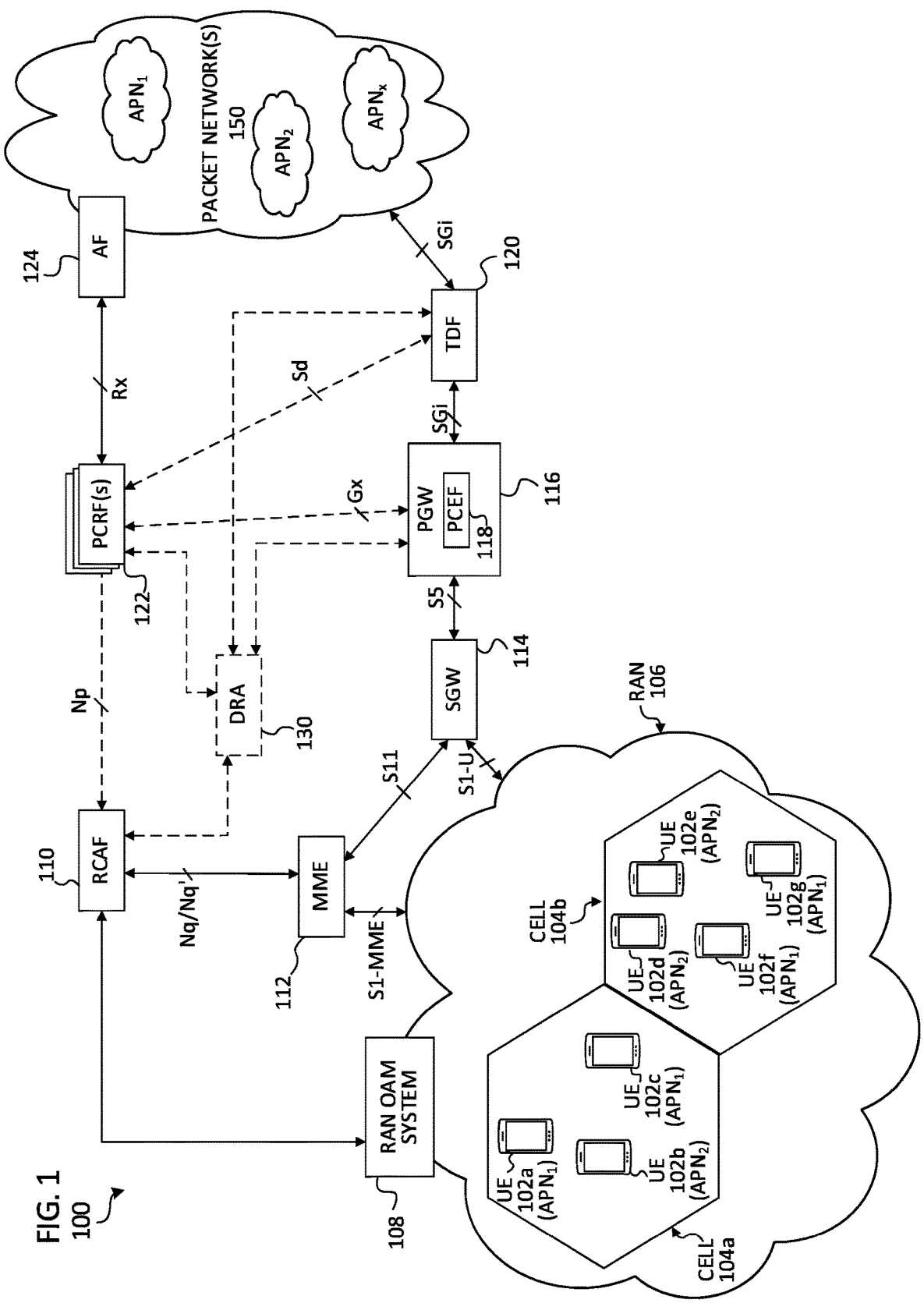
FIG. 1 is a simplified block diagram illustrating a communication system to facilitate group reporting of user equipment congestion information in a network environment according to one embodiment of the present disclosure.

A method is provided in one example embodiment and may include receiving load information for a plurality of cells of a Radio Access Network (RAN), wherein the load information comprises an identity for each cell of the plurality of cells and a corresponding congestion level for each cell of the plurality of cells; determining, for each of a plurality of user equipment (UE) in each cell, identification information for each UE and an Access Point Name (APN) to which each UE is connected; identifying, from a plurality of policy servers, each policy server that serves each APN to which each UE in each cell of the plurality of cells is connected; and sending, to each of a particular policy server, congestion information comprising: an identity for each of one or more cells having UE that are connected to each of one or more APN served by the particular policy server; the corresponding congestion level for each of the one or more cells; and a per-cell UE list identifying each of a plurality of UE connected to each of the one or more APN served by the particular policy server. In some instances, at least one of the policy servers can be a Policy and Charging Rules Function (PCRF). For the method, an efficiency of the sending increases in proportion to an increase in UE in each cell of the plurality of cells.

In some cases, the identifying and the sending can be performed by a RAN Congestion Awareness Function (RCAF). In some instances, the identifying performed by the RCAF can be based on at least one of: configuration information stored at the RCAF that identifies each policy server that serves each APN; and configuration information provided to the RCAF from an external database that identifies each policy server that serves each APN. In some cases, the method can further include determining, by each identified policy server, a congestion status for each UE connected to each APN based, at least in part, on the congestion information received by each identified policy server.

In some cases, the identifying and the sending can be performed by a Diameter Routing Agent (DRA) and the receiving and the determining can be performed by a RCAF, wherein the RCAF is unable to identify each policy server that serves each APN to which each UE is connected. In such cases, the method can include sending an Attribute Value Pair (AVP) to the DRA, wherein the AVP comprises: a particular identity for a particular cell, a particular congestion level of the particular cell, a first list indicating each APN to which each UE in the particular cell is connected, and a second list indicating each of the plurality of UE in the particular cell. In some instances, the RCAF can send a plurality of AVPs to the DRA in one message, wherein each AVP is associated with each of a plurality of cells.

A communication system is provided in one example embodiment and can include an RCAF comprising at least one first memory element for storing first data and at least one first processor that executes instructions associated with the first data; the RCAF being adapted when executed by the at least one first processor to: receive load information for a plurality of cells of a Radio Access Network (RAN), wherein the load information comprises an identity for each cell of the plurality of cells and a corresponding congestion level for each cell of the plurality of cells; determine, for each of a plurality of user equipment (UE) in each cell, identification information for each UE and an Access Point Name (APN) to which each UE is connected; and send, to each of a particular policy server, congestion information comprising: an identity for each of one or more cells having UE that are connected to each of one or more APN served by the particular policy server; the corresponding congestion level for each of the one or more cells; and a per-cell UE list identifying each of a plurality of UE connected to each of the one or more APN served by the particular policy server.

In some cases, the RCAF can be further adapted when executed by the at least one first processor to: identify, from a plurality of policy servers, each policy server that serves each APN to which each UE in each cell of the plurality of cells is connected.

In some cases, the communication system can include a DRA comprising at least one second memory element for storing data and at least one second processor that executes instructions associated with the data and the DRA can be adapted when executed by the at least one second processor to: identify, from a plurality of policy servers, each policy server that serves each APN to which each UE in each cell of the plurality of cells is connected.

In some cases, the RCAF can be further adapted when executed by the at least one first processor to: send an Attribute Value Pair (AVP) to a DRA, wherein the AVP comprises: a particular identity for a particular cell, a particular congestion level of the particular cell, a first list indicating each APN to which each UE in the particular cell is connected, and a second list indicating each of the plurality of UE in the particular cell. In such cases, the RCAF can be further adapted when executed by the at least one first processor to: send a plurality of AVPs to the DRA in one message, wherein each AVP is associated with each of a plurality of cells.

Example Embodiments

Referring to FIG. 1, FIG. 1 is a simplified block diagram illustrating a communication system 100 to facilitate group reporting of user equipment congestion information in a network environment according to one embodiment of the present disclosure. This particular configuration may be tied to a 3rd Generation Partnership Project (3GPP) architecture such as a Long Term Evolution (LTE) architecture, which can include an Evolved Packet Core (EPC) or system (EPS). Alternatively, the depicted architecture may be applicable to other environments equally.

The example architecture of communication system 100 shown in the embodiment of FIG. 1 can include one or more users operating user equipment (UE) 102a-102g within one or more cells 104a-104b of a Radio Access Network (RAN) 106, a RAN Operations, Administration and Management (RAN OAM) system 108, a RAN Congestion Awareness Function (RCAF) 110, a Mobility Management Entity (MME) 112, a Serving Gateway (SGW) 114, a Packet Data Network (PDN) Gateway (PGW) 116, which can be configured with a Policy and Charging Enforcement Function (PCEF) 118, a Traffic Detection Function (TDF) 120, one or more Policy and Charging Rules Functions (PCRF(s)) 122, an Application Function (AF) 124 and one or more packet network(s) 150. In at least one embodiment, communication system 100 can include one or more Diameter Routing Agent (DRA) 130. As discussed in various example embodiments described herein, multiple PCRFs 122 can be referenced using labeling such as 122.1-122.N for 'N' number of PCRFs.

For various embodiments discussed herein, any corresponding PGW and PCEF (e.g., PGW 116 and PCEF 118) can be referred to collectively as 'PGW/PCEF', as various operations, functions and/or activities discussed for various embodiments described herein can be performed with these network elements operating alone and/or in conjunction with each other. It should be understood that any number of UE and/or cells can be present in RAN 106. The UE and cells illustrated in FIG. 1 are provided for illustrative purposes only and are not meant to limit the broad the broad teachings of the present disclosure.

In general, RAN 106 provides a communications interface between UE 102a-102g and MME 112, SGW 114 and PGW 116/PCEF 118. One or more coverage areas can be provided in RAN 106, which are shown as cells 104a-104b for servicing multiple end users and for managing their associated connectivity. In various embodiments, RAN 106 can include radio interface equipment to provide over-the-air (OTA) communications coverage for UE 102a-102g via cells 104a-104b and to provide a communications interface with RAN OAM system 108, MME 112, SGW 114, PGW 116/PCEF 118, etc. The communications interface may facilitate the exchange of data and/or control information between an end user and any number of selected elements within communication system 100. The communications interface may also facilitate the exchange of data and/or control information between one or more elements of RAN 106 (e.g., radio interface equipment) and one or more other elements or nodes of communication system 100.

In some embodiments, coverage for RAN 106 (e.g., provided via cells 104a-104b) can be facilitated via 3GPP access networks such as Global System for Mobile communications (GSM) Enhanced Data rates for GSM Evolution (EDGE) Radio Access Network (GERAN); Universal Mobile Telecommunications System (UMTS) Terrestrial Radio Access Network (UTRAN), generally referred to as 3rd Generation (3G); as Evolved UTRAN (E-UTRAN), generally referred to as 4th Generation (4G), LTE, LTE-Advanced (LTE-A); and/or 5th Generation (5G). In some, coverage for RAN 106 can be can be facilitated via non-3GPP access networks such as, Institute of Electrical and Electronic Engineers (IEEE) 802.11 networks (e.g., Wi-Fi), Worldwide Interoperability for Microwave Access (WiMAX), Bluetooth™, digital subscriber line (DSL), Cable, combinations thereof or the like.

In some embodiments, radio interface equipment deployed within RAN 106 can include one or more radio interface devices configured to provide macro and/or small cell coverage for UE 102a-102g for 3GPP access networks. A radio interface device can provide coverage in a RAN via one or more cell(s). In general, Node Bs (NodeBs) and Radio Network Controllers (RNCs) can be deployed to provide coverage for 3G macro cells in a RAN. In general, Home Node Bs (HNBs) and RNCs can be provide coverage for 3G small cell access networks. In general, evolved Node Bs (eNodeBs) and/or Home eNodeBs (HeNBs), respectively, can be deployed to provide coverage for 4G/LTE/LTE-A macro and/or small cell access networks, respectively. Small cell networks differ from macro networks in that small cell networks are typically comprised of multiple small cell access points, which can provide proximate coverage to users in an environment in which macro network coverage may be limited or interfered (e.g., within a building, structure, facility, etc.). Other suitable types of communications interfaces may be used for any appropriate network design and, further, be based on specific communications architectures in accordance with particular needs.

In various embodiments cells 104a-104b can be deployed as small cells and/or macro cells and may provide access for 3GPP access networks (e.g., 3G/4G/LTE/LTE-A, etc.) and/or non-3GPP access networks (WiFi, WiMAX, etc.). In one embodiment, cells 104a-104b can be provided by one radio interface device (e.g., one eNodeB, one NodeB, etc.). In another embodiment, cells 104a-104b can be provided by different radio interface devices. For the embodiment shown in FIG. 1 UE 102a-102c can be served via cell 104a and UE 102d-102g can be served via cell 104b. The embodiment shown in FIG. 1 regarding which UE is in which cell is provided for illustrative purposes only and is not meant to limit the broad scope of the teachings of the present disclosure. It should be understood that UE 102a-102g or any other UE that may be present in communication system 100 can be served by any cell that may be configured for the communication system.

As discussed for various embodiments described herein, a cell can be identified (e.g., each of cell 104a-104b) can be identified using a corresponding cell identifier (cell-ID) or a radio equipment identifier. In various embodiments, a cell-ID can be a Cell Global Identifier (e.g., for 3G access networks), evolved Cell Global Identifier (ECGI) (e.g., for 4G access networks). In various embodiments, a radio interface device identifier can be an eNodeB-ID or NodeB-ID, depending on access type. For purposes of discussions of various embodiments described herein, only cell-ID is referenced with regard to congestion reporting; however, it should be understood that a radio equipment identifier could also be used in congestion reporting within the scope of the teachings of the present disclosure.

In various embodiments, packet network(s) 150 can be identified using an Access Point Name (APN), such as, for example, $APN_1$, $APN_2$ thru $APN_x$, where 'X' can represent any number of APNs. Typically, an APN is the name of the gateway between a 3GPP architecture and another packet network. A packet network can also be referred to herein as a packet data network (PDN). In various embodiments, packet networks can include the internet, mobile operator Internet Protocol (IP) service networks to provide operator services such as IP Multimedia Subsystem (IMS) services, Multimedia Messaging Service (MMS) services, Voice over IP (VoIP) services, etc., enterprise networks, combinations thereof or the like. It should be understood that the APN labels discussed herein are provided for illustrative purposes only and are not meant to limit the broad scope of the teachings of the present disclosure. For the embodiment shown in FIG. 1 UE 102a, 102c, 102f and 102g can be assumed to be connected to a packet network (e.g., a PDN) identified as $APN_1$ and UE 102b, 102d and 102e can be assumed to be connected to a packet network identified as $APN_2$. The embodiment shown in FIG. 1 regarding which UE is connected to which APN is provided for illustrative purposes only and is not meant to limit the broad scope of the teachings of the present disclosure. It should be understood that UE 102a-102g or any other UE that may be present in communication system 100 can be served connected to any APN that may be configured for the communication system.

Each of the elements of FIG. 1 may couple to one another through simple interfaces or through any other suitable connection (wired or wireless), which provides a viable pathway for network communications. Additionally, any one or more of these elements may be combined or removed from the architecture based on particular configuration needs. In various embodiments, communication system 100 can represent a series of points or nodes of interconnected communication paths (wired or wireless) for receiving and transmitting packets of information that propagate through communication system 100. In various embodiments, communication system 100 can be associated with and/or provided by a single network operator or service provider and/or multiple network operators or service providers. In various embodiments, communication system 100 can include and/or overlap with, in whole or in part, one or more PDN (e.g., packet network(s) 150).

Communication system 100 may offer communicative interfaces between various elements of communication system 100 and may be any local area network (LAN), wireless local area network (WLAN), metropolitan area network (MAN), wide area network (WAN), virtual private network (VPN), Radio Access Network (RAN), virtual local area network (VLAN), enterprise network, Intranet, extranet, or any other appropriate architecture or system that facilitates communications in a network environment.

In various embodiments, communication system 100 may implement user datagram protocol/Internet Protocol (UDP/IP) connections and/or transmission control protocol/IP (TCP/IP) communication language protocol in particular embodiments of the present disclosure. However, communication system 100 can alternatively implement any other suitable communication protocol, interface and/or standard, proprietary and/or non-proprietary, for transmitting and receiving messaging and/or signaling. Other protocols, interfaces and/or communication standards that can be used in communication system 100 can include 3GPP Diameter-based protocols, Remote Authentication Dial-In User Service (RADIUS) protocols, Authentication, Authorization and Accounting (AAA) signaling, service gateway interface (SGi), a Terminal Access controller access-control system (TACACS), TACACS+, Proxy Mobile IP version 6 (PMIPv6), Proxy Mobile IP version 4 (PMIPv4), Extensible Messaging and Presence Protocol (XMPP), General Packet Radio Service (GPRS) Tunneling Protocol (GTP) (version 1 or version 2), Generic Route Encapsulation (GRE), Ethernet over GRE (EoGRE), etc. In various embodiments, AAA signaling can include signaling exchanges facilitated via Diameter, RADIUS, Extensible Messaging and Presence Protocol (XMPP), Simple Object Access Protocol (SOAP), SOAP over Hypertext Transfer Protocol (HTTP), Representational State Transfer (REST), combinations thereof or the like.

Generally, interfaces, such as, for example SGi, Rx, Gx, Gy, Gz, Sp, Sd, Np, Nq, Nq', etc. can represent reference points for certain communication protocols which may facilitate communications between various network elements as generally provided in 3GPP Technical Specification (TS) 23.002, TS 23.203, 23.401, TS 29.212, TS 29.214, TS 29.217, etc. For the architecture of FIG. 1, Rx interface(s) can be provisioned to facilitate communications between PCRF(s) 122 and AF 124; and SGi interfaces can be provisioned to facilitate communications between PGW 116/PCEF 118 and TDF 120 and between TDF 120 and packet network(s) 150.

Other interfaces shown in the architecture of FIG. 1, can include an Nq/Nq' interface to facilitate communications between MME 112 and RCAF 110 for exchanging information related to user-plane congestion (UPCON) information; an S11 interface to facilitate communications between MME 112 and SGW 114; an S1 user-plane (S1-U) interface to facilitate user-plane communications between RAN 106 (e.g., for radio interface equipment (not shown) within RAN 106); an S1-MME interface to facilitate control-plane communications between RAN 106 and MME 112 (e.g., for radio interface equipment (not shown) within RAN 106); and an S5 interface to facilitate communications between SGW 114 and PGW 116/PCEF 118. RAN OAM system 108 can also interface with radio interface equipment within RAN 106 and RCAF 110.

As discussed in further detail herein, in some embodiments DRA 130 (and/or multiple DRAs) can be deployed in communication system 100. For embodiments in which there is no DRA deployed in communication system 100, Sd interface(s) can be provisioned to facilitate communications between each respective PCRF(s) 122 and TDF 120; Gx interface(s) can be provisioned to facilitate communications between each respective PCRF(s) 122 and PGW 116/PCEF 118; and Np interface(s) can be provisioned to facilitate communications between RCAF 110 and each respective PCRF(s) 122 related to UPCON information. For embodiments in which a DRA (e.g., DRA 130) is deployed in communication system 100, various interfaces can be provisioned to facilitate communications between DRA 130, RCAF 110, PCRF(s) 122, PGW 116/PCEF 118 and TDF 120 including: Np interface(s) to facilitate exchanges between the RCAF 110 and the PCRF(s) 122 via the DRA 130; Gx interface(s) to facilitate exchanges between PCRF(s) 122 and PGW 116/PCEF 118; and Sd interface(s) to facilitate PULL/Unsolicited mode exchanges between TDF 120 and PCRF(s) 122 via the DRA 130 and Sd interface(s) to facilitate PUSH/Solicited mode exchanges between PCRF(s) 122 and the TDF 120.

As referred to herein in this Specification, the terms 'user', 'subscriber', 'UE' and 'subscriber/UE' can be used interchangeably. It should be understood that a user, or more particularly, a subscriber, can be associated with the operation of a corresponding UE for one or more voice and/or data sessions. In various embodiments, a subscriber associated with a given UE can be identified using one or more identifiers such as, for example, an International Mobile Subscriber Identity (IMSI) or a Temporary IMSI (T-IMSI). An IMSI for a given subscriber is typically stored on a Subscriber Identity Module (SIM) (e.g., a SIM card) within the subscriber's UE.

In various embodiments, UE 102*a*-102*g* can be associated with any users, subscribers, employees, clients, customers, electronic devices, etc. wishing to initiate a flow in communication system 100 via some network. In at least one embodiment, UE 102*a*-102*g* can be configured to facilitate simultaneous Wi-Fi connectivity and cellular connectivity within communication system 100. The terms 'user equipment', 'mobile node', 'mobile station' or 'mobile device' are inclusive of devices used to initiate a communication, such as a computer, an electronic device such as a parking meter, vending machine, appliance, Internet of Things (IoT) device, etc., a personal digital assistant (PDA), a laptop or electronic notebook, a cellular telephone, an i-Phone™, iPad™, a Google Droid™ phone, an IP phone, wearable electronic device or any other device, component, element, or object capable of initiating voice, audio, video, media, or data exchanges within communication system 100. UE 102*a*-102*g* discussed herein may also be inclusive of a suitable interface to a human user such as a microphone, a display, a keyboard, or other terminal equipment.

UE 102*a*-102*g* may also be any device that seeks to initiate a communication on behalf of another entity or element such as a program, a database, or any other component, device, element, or object capable of initiating an exchange within communication system 100. In certain embodiments, UE 102*a*-102*g* may have a bundled subscription for network access and application services (e.g., voice), etc. In one embodiment, once an access session is established for a UE, the user associated with the UE can register for application services as well, without additional authentication requirements. Within communication system 100 or any other communication system described herein, IP addresses (e.g., for UE or any other element) can be assigned using dynamic host configuration protocol (DHCP), Stateless Address Auto-configuration (SLAAC), during default bearer activation processes, etc., or any suitable variation thereof. IP addresses used within communication system 100 can include IPv4 and/or IPv6 IP addresses.

In various embodiments, RAN OAM system 108 may provide operations, administration and management functions to enable operation and/or monitoring of RAN 106 including, but not limited to: monitoring, measuring and/or managing cell-level operations, resources, etc. (e.g., cell loading, congestion, radio frequency (RF) conditions, RF signal strength, etc.) for macro and/or small cell networks; monitoring, measuring and/or managing RAN-level resources and/or congestion (e.g., network loading, load balancing, etc. among RAN equipment and/or resources), combinations thereof or the like.

During operation, in at least one embodiment, RAN OAM system 108 can monitor loading (e.g., congestion) in each cell 104*a*-104*b* and can send RCAF 110 cell load reports which identify a cell-ID for a given cell and a load or congestion level for the cell. In some embodiments, load level can be reported using a numerical value such as, for example, a percentage that relates to a total number of UE and/or resources that can be scheduled by radio interface equipment for a cell and a current number of UE and/or resources currently being scheduled by the radio interface equipment. In some embodiments, load level can be reported as a relative value such as, for example, low, medium or high.

In various embodiments, RAN OAM system 108 can monitor loading for RAN 106 either directly or indirectly. By directly, it is meant that RAN OAM system 108 can collect congestion information from directly from radio interface equipment in RAN 106 and by indirectly, it is meant that RAN OAM system 108 can congestion information via a Self-Organizing Network (SON) system, which may receive inputs from a variety of sources including, but not limited to, one or more network monitoring mechanisms/techniques, RAN OAM system 108, etc. to determine cell loading.

In various embodiments, network monitoring mechanisms/techniques can include, for example, various types of network 'probes' (e.g., inline, passive, hardware-based, software-based, etc.), which may infer congestion using one or more techniques, such as, for example, packet round trip times (RTTs) and/or jitter, transmission control protocol (TCP) behavior, etc. In various embodiments, network monitoring mechanisms/techniques can include using inline proxies (e.g., similar to a transparent proxy used for video optimization) that can infer from content delivery that a user is experiencing congestion and/or possibly poor Radio Frequency (RF) conditions. In various embodiments, congestion could also be detected based on device measurements, individually or 'crowd sourced' (e.g., from multiple devices). In various embodiments, congestion may be detected based upon measurements that are approximately 'real-time', that have some approximate latency, and/or could be based upon prior patterns or models. These examples are just a few of the many processes, devices, systems, etc. that could be used to detect congestion. It should be understood that congestion could be detected using a variety of other processes, devices, systems, etc. within the scope of the present disclosure.

In at least one embodiment, upon receiving load reporting from RAN OAM system 108, RCAF 110 can generate aggregated, cell-level RAN User Plane Congestion Information (RUCI) or, more generally, cell-level congestion information for each of a given cell 104*a*, 104*b* for a group of UE served by each cell 104a, 104b. As discussed in further detail for various embodiments described herein, RCAF 110 can, during operation, communicate cell-level congestion information to one or more PCRF(s) 122 either directly (e.g., using direct NP interface(s) provisioned between RCAF 110 and PCRF(s) 122) or indirectly (e.g., via Np interface(s) facilitated by DRA 130, if provisioned in communication system 100). In at least one embodiment, the communication of cell-level congestion information from RCAF 110 to PCRF(s) 122 does not require a per-UE connection and/or session to be established between RCAF 110 and PCRF(s) 122 via direct or indirect Np interface(s).

Generally, MME 112, SGW 114, PGW 116/PCEF 118 and PCRF(s) 122 comprise the EPC for LTE architectures. In some embodiments, MME 112 can be configured with functionality for a Serving General Packet Radio Service (GPRS) Support Node (SGSN) to support connectivity for legacy architectures such as 3G. Among other things as discussed for various embodiments described herein, MME 112 can provide tracking area list management, idle mode UE tracking, bearer activation and deactivation, SGW and PGW selection for UEs and authentication services. SGW 114 is a data plane element that can route and forward user data packets, while also acting as a mobility anchor for the user plane during inter-cell handovers and as an anchor for mobility between LTE and other 3GPP technologies. PGW 116/PCEF 118 may provide IP connectivity access network (IP-CAN) session connectivity for UEs to external packet data networks, such as, for example, packet network(s) 150 as well for providing session connectivity for UE service data flows (SDFs) with TDF 120. PGW 116/PCEF 118 may serve as a policy and charging enforcement point to manage Quality of Service (QoS), online and/or offline flow-based charging, data generation, deep-packet inspection and intercept. In some embodiments, PGW 116/PCEF 118 can interface directly with a given PDN without intermediation via TDF 120.

In various embodiments, PCRF(s) 122 can aggregate information to and from communication system 100, operational support systems, such as, for example, RAN OAM system 108, RCAF 110, AF 124, and/or other sources (e.g., portals) in real-time, supporting the creation of policy and charging control (PCC) rules and then automatically making policy and/or charging decisions for each of a respective subscriber associated with each respective UE 102a-102g. A PCRF can be referred to as a 'policy server' for various embodiments discussed herein.

PCRF(s) 122 can be configured to use user subscription information as a basis for the policy and charging control decisions. PCRF(s) 122 can provision PCC rules for PGW 116/PCEF 118. Subscription information may apply for both session-based and non-session based services. In some embodiments, PCRF(s) 122 can interface with a Subscription Profile Repository (SPR) (not shown) in order to gather user subscription information for one or more UE. In some embodiments, an SPR can be combined with or distributed across other databases that may be configured for communication system 100. In some embodiments, an SPR can be combined with and/or provided in conjunction with a user data repository (UDR), which can be used to store user information, that may be separate and/or distinct from user subscription information, such as, for example, user behavior data, configurable user preferences, demographic information, etc. A particular PCRF can serve one or more APN(s), which means that the particular PCRF can provide policy and charging control decisions for all UEs connected to the PDN(s) for the associated APN(s).

In general, a DRA (e.g., DRA 130) can select a PCRF for each UE session and can proxy traffic on a per-DIAMETER session basis for each UE IP-CAN session. In at least one embodiment, DRA 130 can provide a proxy for communicating policy, charging and/or congestion information between multiple clients (e.g., between RCAF 110, PCRF(s) 122, PGW 116/PCEF 118, TDF 120, etc.) provisioned for communication system 100.

In various embodiments, AF 124 can describe applications/services to PCRF(s) 122 (e.g., via Information Elements (IEs) such as, for example, media type and media description, priority, uplink/downlink requirements, application identifier, etc.) that may require dynamic policy and/or charging control for any of UE 102a-102g. The dynamic policy and/or charging controls may include, but not be limited to, setting quality of service (QoS) levels and/or gating.

In various embodiments, TDF 120 can provide services for UE SDFs. In various embodiments, such services can include, for example, gating, redirection, bandwidth limitations, combinations thereof or the like as described in 3GPP TS 29.212. In general, an SDF can correspond to services, applications, etc., which can be provided to a user/UE (e.g., to enhance user experience) and are typically identified using 5-tuple parameters contained in a Flow-Description Attribute Value Pair (AVP). In at least one embodiment, 5-tuple parameters contained in a Flow-Description AVP, sometimes referred to generally as a flow mask, can include a source-IP address, a destination-IP address, a source-port, a destination-port and a transport protocol for a packet.

Communications in a network environment are referred to herein as 'messages', 'messaging' and/or 'signaling', which may be inclusive of packets. Generally, signaling is referred to in reference to control-plane packets while messaging can be referred to in reference to control-plane or data-plane packets exchanged for communications at the application level.

A packet is a formatted unit of data and can contain both control information (e.g., source and destination address, etc.) and data, which is also known as payload. In some embodiments, control information can be included in headers and trailers for packets. Messages can be sent and received according to any suitable communication messaging protocols. Suitable communication messaging protocols can include a multi-layered scheme such as the Open Systems Interconnection (OSI) Model, or any derivations or variants thereof. The terms 'data', 'information' and 'parameters' as used herein can refer to any type of binary, numeric, voice, video, textual or script data or information or any type of source or object code, or any other suitable data or information in any appropriate format that can be communicated from one point to another in electronic devices and/or networks. Additionally, messages, requests, responses, replies, queries, etc. are forms of network traffic and, therefore, may comprise one or more packets.

Before detailing other operational aspects of the architecture shown in FIG. 1, it is important to understand common characteristics of congestion reporting as typically provided in current commercial architectures. The following foundation is offered earnestly for teaching purposes only and, therefore should not be construed in any way to limit the broad teachings of the present disclosure.

3GPP Technical Specifications Release 12 defined architecture and requirements for UPCON reporting that enables an RCAF to report to a PCRF the UEs that are in a congested cell. During operation in current deployments, the RAN OAM system provides the congestion level of a cell(s) along with the cell-ID to the RCAF via an interface provisioned between the RAN OAM system and the RCAF. At the request of the RCAF, the MME/SGSN provides a list of IMSI(s) for UE(s) in the congested cell(s) and a list of APN(s) of the active PDN connection(s) of each of the IMSI(s) in the congested cell(s) to the RCAF over the Nq/Nq' interface. Per 3GPP TS 23.401 and 23.203, RUCI can be sent from the RCAF to the PCRF(s) serving APN(s) of the active PDN connections of each of the IMSI(s) in the congested cell(s) using the Np reference point and the PCRF(s) can select measures to mitigate the congestion in the cell(s). Congestion mitigation measures and decisions to apply the measures by PCRF(s) can take into consideration network operator and/or service provider policies, subscriber information and/or IP-CAN session information.

In current deployments, the RCAF initiates a per UE/IMSI session over the Np interface to the PCRF(s) to report RUCI to the PCRF(s), along with congestion level per UE as determined by the RCAF. A typical operational flow in current deployments involves the RAN OAM system sending cell-ID and congestion level information or, more generally, load reports, to the RCAF for cell(s) under management of the RAN OAM system. The RCAF retrieves IMSI and APN information for each UE(s) in the cell(s) from the MME via the Nq/Nq' interface. The RCAF then determines which PCRF(s) service sessions for the APN(s) of the PDN(s) to which each of the UE(s) in the cell(s) are connected and establishes a per UE session with the PCRF(s) over the Np interface(s), directly or indirectly (e.g., depending on whether a DRA is deployed), with each PCRF(s).

The RCAF then determines a congestion level of each UE in a congested cell and reports RUCI to the PCRF(s) on a per-UE or aggregate UE basis. The reporting can be done directly from the RCAF to the PCRF(s) or indirectly via a DRA, if deployed. In some cases, a PCRF can restrict and/or cancel per-UE reporting from the RCAF for certain UE by signaling to the RCAF which UE/IMSI reporting is to be restricted/cancelled. In DRA deployments, the DRA is provided PCRF and APN Gx session binding information for each IMSI/UE Gx session in order to relay signaling between the RCAF and appropriate PCRF(s) servicing sessions of corresponding APN(s) for corresponding active PDN connections of the UE. In general, a Gx session is established via a given PCRF, MME, SGW and PGW/PCEF for a given UE during default bearer activation for the UE. A Radio Access Bearer (RAB) or, more generally, a 'bearer' can refer to a path, channel, tunnel or the like through which communications can be exchanged between two endpoints for a particular service, application, etc. Typically, bearers are referred to in association to communications exchanged between a UE and one or more elements or nodes of an EPC or EPS for LTE architectures. At a minimum, a default bearer, as defined in 3GPP standards, is established for a given UE upon initial attachment of the UE to a radio interface device (e.g., an eNodeB) in a given RAN. In some instances, one or more dedicated bearers can be established for a given UE for one or more specialized services or applications provided to the UE such as, for example, a Voice over LTE (VoLTE) session, a data session, a Voice over IP (VoIP) session, a gaming session, combinations thereof or the like.

There are several drawbacks to RUCI reporting in current deployments, however. One drawback involves the per-UE session establishment between the RCAF and the PCRF(s) in current deployments. For example, hundreds or thousands of UEs can be in a congested cell. Establishing per-UE sessions between the RCAF and the PCRF(s) generates excessive Diameter signaling between the RCAF and the PCRF(s) given the number of UEs that can potentially be in a congested cell. Another drawback in current deployments involves the RCAF determining a congestion level of each UE in a congested cell. In current deployments, the RCAF determines a congestion level for each UE in a congested cell based on a service provider configuration. The congestion level is set to a numerical value based on congestion in a cell; however, the level is set without the benefit of the RCAF having a standardized access to a UE's profile (e.g., subscription and/or session information) or knowing the current PDN connections/sessions of the UE (e.g., the RCAF may know the APN(s) to which a UE is connected, but does not know the specific connections and/or sessions (e.g., video session, data session, etc.) of the UE) and the usage type of the UE (e.g., 'heavy user', 'light user', etc.).

In accordance with various embodiments described herein, communication system 100 can overcome these shortcomings (and others) by providing systems and methods to facilitate group reporting of UE congestion information in a network environment. In various embodiments, methods described herein can be executed by one or more hardware processors configured for RAN OAM system 108, RCAF 110, PCRF(s) 122, MME 112 and/or DRA 130, depending on the architecture configured for communication system 100. Generally, the systems and methods provided by communication system 100 in accordance with various embodiments described herein can facilitate group reporting of UE congestion information rather than per-UE RUCI signaling, as is typically provided in current deployments.

During operation, RCAF 110 can receive load information from RAN OAM system 108 for one or more cell(s) in RAN 106 (e.g., cell 104a, 104b). The load information can be sent from RAN OAM system 108 both for the cell(s) that are experiencing congestion and for the cell(s) that are not experiencing congestion. In at least one embodiment, load information reported from RAN OAM system 108 can include a cell-ID for each cell 104a-104b and a corresponding congestion level for each cell in a two-tuple format configured as {cell-ID, congestion level}. In at least one embodiment, load information for multiple cells can be included in a load report sent from RAN OAM system 108.

Upon receiving load information from the RAN OAM system 108, RCAF 110 can retrieve a list of UEs served (e.g., connected to radio equipment) in each cell 104a-104b from MME 112 and the APN to which each UE is connected. The RCAF 110 can identify one or more cell(s) to the MME 112 for which a list of UEs is requested. In at least one embodiment, the MME 112 sends RCAF 110 the list of UEs served in each cell in a two-tuple format configured as {IMSI, APN} for a given cell-ID, as requested by RCAF 110. In at least one embodiment, MME 112 can send multiple lists for each of multiple cells, if requested by RCAF 110.

In various embodiments, the RCAF 110 can report cell-level congestion information to PCRF(s) 122 serving APN(s) identified by MME 112 for a group of UE connected to each APN(s) in one or more cell(s) 104a, 104b either directly or indirectly. In contrast with current deployments, the reporting by RCAF 110 within communication system 100 does not require a per-UE session with PCRF(s) 122 for the group RUCI reporting.

Consider one operational example in which DRA 130 is not configured in communication system 100 in accordance with one example embodiment. For this operational example, it is assumed that RCAF 110 can, in various embodiments, be configured by a network operator and/or service provider with 'PCRF-APN' configuration information regarding which of a particular PCRF (from multiple possible PCRFs 122) services sessions for which APN(s) and/or can retrieve such configuration information from an external database or other similar storage device.

In at least one embodiment, PCRF-APN configuration information can identify an association between a particular PCRF and a particular APN using a PCRF identifier (PCRF-ID) that includes a destination-realm (dest-realm) and a destination-host (dest-host) for the PCRF and the APN that the PCRF serve. The PCRF-APN configuration information can be formatted as '{PCRF-ID (dest-realm; dest-host), APN}'. The dest-realm field can identify the IP domain for the particular PCRF, the dest-host field can identify the PCRF associated with the realm and the APN field can identify a given APN that the PCRF serves.

Using the PCRF-APN configuration information and the {IMSI, APN} information received from MME 112, RCAF 110 can identify a group of UE in one or more cell(s) 104a, 104b for which to report cell-level group RUCI and can identify a particular PCRF for a particular APN to which to send the cell-level group RUCI. The RCAF 110 can generate a message to send to the particular PCRF that includes aggregate cell-level RUCI for the group of identified UE for the particular APN and can send the message to the identified PCRF. In one embodiment, the message can be an Np Aggregated-RUCI-Report-Request (ARR) command as defined in 3GPP TS 29.217. In one embodiment, a particular message sent to a particular identified PCRF can include the cell-ID for a given cell, the congestion level for the cell and the list of UEs identified by IMSIs that are associated with a particular APN served by the PCRF. In at least one embodiment, a particular message sent to a particular identified PCRF can include multiple cell-IDs, each cell-ID being associated with a particular congestion level and a list of UEs in the cell that are associated with a particular APN served by the PCRF. In at least one embodiment, if a PCRF serves multiple APNs, the RCAF 110 can generate a particular message that includes lists for each cell and each APN served by the PCRF. TABLE 1 below illustrates example details that can be associated with an example ARR command for reporting the aggregate RUCI.

TABLE 1

Aggregated-RUCI-Report-Request (ARR) Command

```
<AR-Request> ::= <Diameter Header: xxxxxx, REQ, PXY >
                < Session-Id >
                { Auth-Application-Id }
                { Auth-Session-State }
                { Origin-Host }
                { Origin-Realm }
                { Destination-Realm }
                [ Destination-Host ]
                [ Origin-State-Id ]
                *[ Aggregated-RUCI-Report ]
                *[ Proxy-Info ]
                *[ Route-Record ]
                *[ AVP ]
```

As shown in TABLE 1, the ARR command can include an Aggregated-RUCI-Report AVP. In some embodiments, multiple instances of the Aggregated-RUCI-Report AVP can be included in an ARR command, such as, for example, if UEs connected to a particular APN served by a particular PCRF are spread across multiple cells and/or if the particular PCRF serves multiple APNs. TABLE 2, shown below, illustrates example details that can be associated with the Aggregated-RUCI-Report AVP.

TABLE 2

Aggregated-RUCI-Report AVP

```
Aggregated-RUCI-Report ::
    = < AVP Header: aaaa >
                [ Congestion-Level-Value ]
                [ Called-Station-Id ]
                *[ Aggregated-Congestion-Info ]
                *[ AVP ]
```

The Aggregated-RUCI-Report AVP includes a Congestion-Level-Value AVP, a Called-Station-Id AVP and an Aggregated-Congestion-Info AVP. For a given instance of an Aggregated-RUCI-Report AVP that may be present in an ARR command, the Congestion-Level-Value AVP can be set to the congestion level for a given cell and the Called-Station-ID AVP can be set to a given APN for which the message is to be generated. The Aggregated-Congestion-Info AVP can include a list of IMSIs for a given cell connected to the APN. TABLE 3, shown below, illustrates example details that can be associated with the Aggregated-Congestion-Info AVP as defined in 3GPP TS 29.217.

TABLE 3

Aggregated-Congestion-Info AVP

```
Aggregated-Congestion-Info ::
    = < AVP Header: yyyy >
                [ Congestion-Location-Id ]
                [ IMSI-List ]
                *[ AVP ]
```

The Aggregated-Congestion-Info AVP includes a Congestion-Location-Id and an IMSI-List AVP. The IMSI-List AVP can include a list of UE each identified by their corresponding IMSI that are connected to a given APN in a given cell. TABLE 4, shown below, illustrates example details that can be associated with the Congestion-Location-Id AVP, as defined in 3GPP TS 29.217.

TABLE 4

Congestion-Location-Id AVP

```
Congestion-Location-ID ::
    = < AVP Header: jjjj >
                [ 3GPP-User-Location-Info ]
                [ eNodeB-Id ]
                *[ AVP ]
```

The Congestion-Location-Id AVP can include a 3GPP-User-Location-Info AVP and an eNodeB-Id AVP. For the Congestion-Location-Id AVP, the 3GPP-User-Location-Info AVP can either be set to the cell-ID for a given cell or a Service Area Identifier (SAI) and the eNodeB-Id AVP can be set to an eNodeB identifier for a given eNodeB connected to the group of UE. If the cell-ID is set for the 3GPP-User-Location-Info AVP, then the eNodeB-Id is not set.

Thus, for embodiments in which there is no DRA in communication system 100, RCAF 110 can directly send each PCRF(s) aggregated RUCI for group(s) of UE connected to each APN(s) served by each PCRF(s) for each cell(s) within RAN 106. For example, in one embodiment, RCAF 110 could send a given PCRF serving sessions for APN₁ aggregate RUCI for a group of UE including UE 102*a* and 102*c* for cell 104*a* and could send the PCRF aggregate RUCI for a group of UE including UE 102*f* and 102*g* using a single ARR command containing two instances of the Aggregated-RUCI-Report AVP, one for each cell. Under an assumption that APN₂ is served by a different PCRF, RCAF 110 could also send the PCRF serving sessions for APN₂ aggregate RUCI for a group of UE including 102*b* for cell 104*a* could send the PCRF aggregate RUCI for a group of UE including 102*d* and 102*e* for cell 104*b* using a single ARR command containing two instances of the Aggregated-RUCI-Report AVP, one for each cell. However, if a particular PCRF were serving both APN1 and APN2, RCAF could send aggregate RUCI for both cell 104*a* and 104*b* and for both APN1 and APN2 to the particular PCRF using a single ARR command containing four instances of the Aggregated-RUCI-Report AVP, one for each cell for each APN.

Consider another operational example in communication system 100 is configured with DRA 130 in accordance with one example embodiment. For this operational example, the RCAF is not aware of the PCRF APN bindings. Instead DRA 130 is provided PCRF and APN Gx session binding information for each IMSI/UE in order to relay signaling between the RCAF 110 and appropriate PCRF(s) servicing sessions of corresponding APN(s) for corresponding active PDN connections of the UE.

In the present operational example in which DRA 130 is provisioned in communication system 100, RCAF 110 can use the {IMSI, APN} information received from MME 112 identify all the APN(s) to which each of a group of UE in one or more cell(s) 104*a*, 104*b* is connected. The RCAF 110 can generate a message to send to DRA 130 that includes aggregate RUCI for the group of UE in each of a given cell and all APN(s) to which the group of UE in each cell are connected. In one embodiment, the message can be an Np ARR command that is enhanced with a new Aggregated-All-APN-List-RUCI-Report AVP that is set to include a list of all APN(s) to which each of a group of UE in each of a given cell are connected. TABLES 5-6 shown below illustrates example details that can be associated with an enhanced ARR command and an Aggregated-All-APN-List-RUCI-Report AVP that can be used to send aggregate RUCI in accordance with one potential embodiment of communication system 100.

TABLE 5

Enhanced Aggregated-RUCI-Report-Request (ARR) Command

<AR-Request> ::= <Diameter Header: xxxxxx, REQ, PXY >
        < Session-Id >
        { Auth-Application-Id }
        { Auth-Session-State }
        { Origin-Host }
        { Origin-Realm }
        { Destination-Realm }
        [ Destination-Host ]
        [ Origin-State-Id ]
        *[ Aggregated-All-APN-List-RUCI-Report ]
        *[ Proxy-Info ]
        *[ Route-Record ]
        *[ AVP ]

As shown in TABLE 5, the enhanced Aggregated-RUCI-Report-Request (ARR) command can be configured with a new Aggregated-All-APN-List-RUCI-Report AVP. As shown in TABLE 6, the new Aggregated-All-APN-List-RUCI-Report AVP can include a Congestion-Level-Value AVP, which can be set as discussed above for TABLE 2, an enhanced Called-Station-Id AVP, which can be enhanced to include a list of all APN(s) to which UE in a given cell are connected, and an Aggregated-Congestion-Info-AVP, which can be set as discussed above in TABLES 3 and 4.

TABLE 6

Aggregated-All-APN-List-RUCI-Report AVP

Aggregated-All-APN-List-RUCI-Report ::
  = < AVP Header: aaaa >
        [ Congestion-Level-Value ]
        *[ Called-Station-Id ]
        *[ Aggregated-Congestion-Info ]
        *[ AVP ]

Thus, the enhanced Aggregated-RUCI-Report-Request (ARR) command can be used to carry the new Aggregated-All-APN-List-RUCI-Report AVP, which can carry the enhanced Called-Station-Id AVP that can identify all APNs to which UE in a given cell are connected. In at least one embodiment, multiple instances of the Aggregated-All-APN-List-RUCI-Report AVP can be included in an enhanced ARR command if UEs connected to a given APN are spread across multiple cells. For example, RCAF 110 can generate and send DRA 130 an enhanced Np ARR command including aggregate RUCI for UE 102*a*-102*c* in cell 104*a* including a list of APNs identifying APN₁ and APN₂ to which the UEs in the cell are connected to and for UE 102*d*-102*g* in cell 104*b* including a list of APNs identifying APN₁ and APN₂ to which the UEs in the cell are connected. In contrast with the previous operational example in which no DRA was provisioned in communication system 100, RCAF 110 for the present operational example does not identify groups of UE connected to each APN and does not identify the PCRF to which to send aggregate RUCI. Rather, RCAF 110 for the present operational example sends DRA 130 aggregate RUCI for all UEs in each of one or more cell(s) that includes a list of all APNs to which the UEs are connected for each cell.

Using the PCRF and APN Gx session binding information for each IMSI/UE, the DRA 130 can identify a group of UE connected to each APN₁ and APN₂, can identify an appropriate PCRF serving each APN₁ and APN₂ and can send each identified PCRF a standard Np ARR command (e.g., as shown in TABLE 1) including aggregate RUCI for the UE connected to the APN served by the PCRF.

Thus, for embodiments in which there is one or more DRA(s) deployed in communication system 100, RCAF 110 can indirectly send, via a DRA, each PCRF(s) aggregated RUCI for a group of UE connected to each APN(s) served by each PCRF(s) for each cell(s) of RAN 106 without RCAF 110 needing the PCRF-APN configuration information for each PCRF(s) and APN(s).

Accordingly, the systems and methods provided by communication system 100, which may or may not be provisioned with one or more DRA(s), can, in various embodiments, provide for a reduction in signaling traffic between the RCAF 110 and PCRF(s) 122 through aggregate RUCI reporting for congested cell(s) in comparison to the per-UE signaling that is typically used in current deployments. Upon receiving aggregated RUCI for each of one or more cell(s), a given PCRF 122 can determine the congestion level of each UE in each respective cell based on various information available to the PCRF including, but not limited to, the reported congestion level of each respective cell, each respective UE's subscription profile (e.g., subscription information, subscription classification such as gold, silver, bronze, etc.), each respective UE's current connections and/or each respective UE's usage status (e.g., heavy, light, etc.). Thus, communication system 100 can provide for exposing UE congestion level to the application layer that can take into account application type and application service provider identity to make policy and/or charging decisions for UE.

In comparison to a typical current deployment involving RUCI signaling for each UE in a cell having say, for example, one thousand UEs connected to different APNs, the system and methods provided by communication 100 can, for an embodiment in which no DRA is configured in the communication system, reduce the signaling from one thousand RUCI reports for each UE in one or more cell(s) to signaling that involves merely sending an aggregate RUCI report to each PCRF serving each APN to which each UE are connected using an Np ARR command that includes the congestion level of one or more cell(s) and the list of UEs connected to one or more APN(s) served by each PCRF. For an embodiment in which a DRA is configured in communication system 100, the signaling can be reduced from sending congestion reports for each UE to sending one enhanced Np ARR command to the DRA from the RCAF 110 that includes the congestion level for each of one or more cell(s), a list of APN(s) to which each UE in each respective cell are connected and the list of UE (IMSIs) in each respective cell. The DRA, rather than sending one thousand RUCI reports to each PCRF serving each APN, as is typically done in current deployments, can send an aggregate RUCI report to each PCRF serving each of one or more APN(s) to which the UE are connected using an Np ARR command that includes the congestion level of one or more cell(s) and the list of UEs connected to one or more APN(s) served by each PCRF.

Thus, the system and method provided by communication system 100 can provide for a signaling efficiency that increases in proportion to the number of UE present in each of one or more cells. Since aggregate RUCI can be reported for all UEs in one message from the RCAF to each of one or more PCRF(s) (e.g., in a no DRA deployment) or one message to a DRA (e.g., in a DRA deployment) for all UEs and all APNs and then one message from the DRA to each of one or more PCRF(s) for each APN(s) served by each PCRF(s), the signaling efficiency that can be realized by the solution provided by communication system 100 will increase as the number of UE increases in the system as compared to per-UE signaling used in current deployments.

Figure 2:
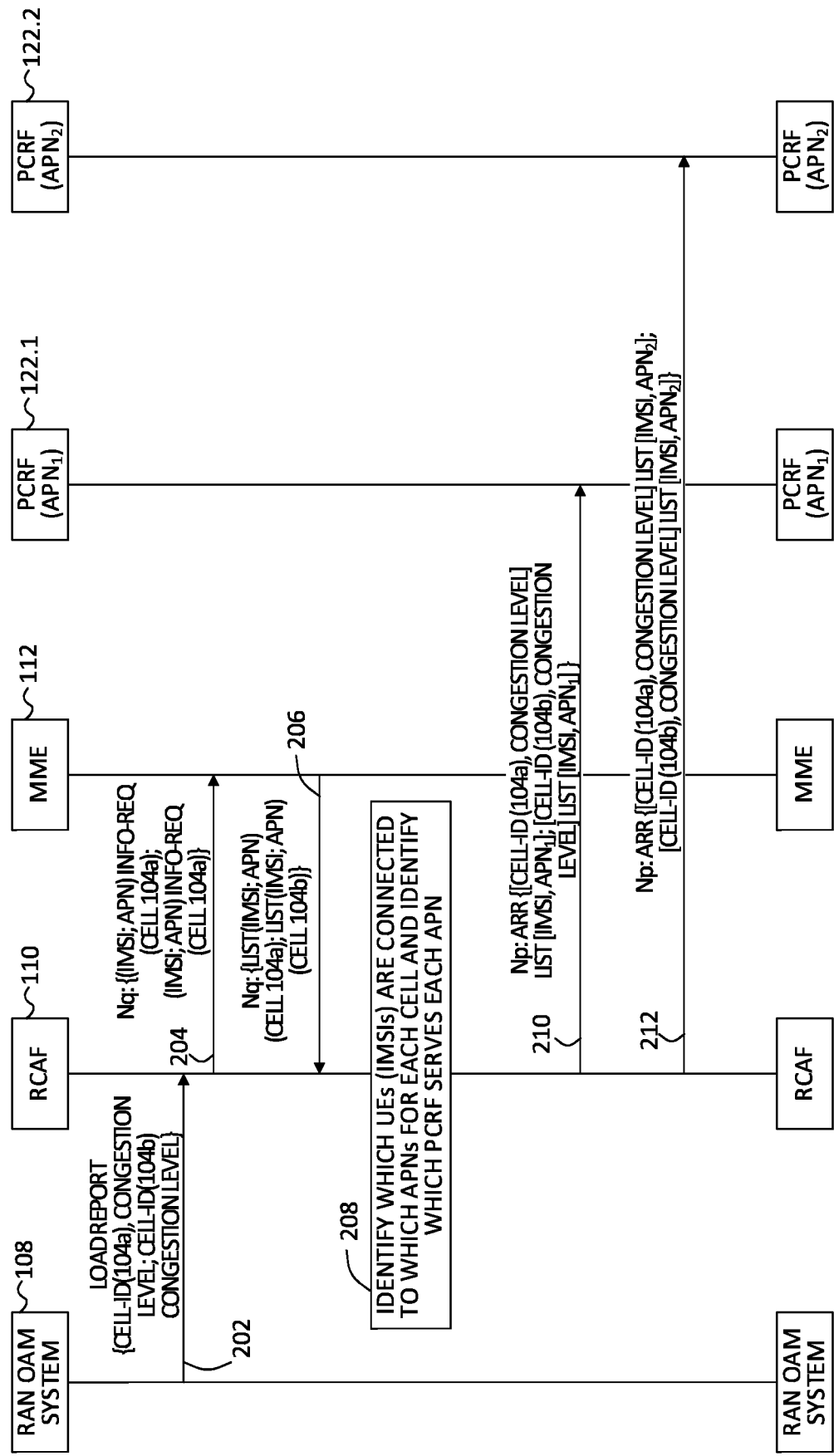
FIG. 2 is a simplified interaction diagram illustrating example interactions and operations that can be associated with group reporting of user equipment congestion information in accordance with one potential embodiment of the communication system.

Referring to FIG. 2, FIG. 2 is a simplified interaction diagram 200 illustrating example interactions and operations that can be associated with group reporting of user equipment congestion information in accordance with one potential embodiment of communication system 100. In particular, the embodiment shown in FIG. 2 can be associated with a configuration of communication system 100 in which DRA 130 is not provisioned in the communication system. FIG. 2 includes RAN OAM system 108, RCAF 110, MME 112, a first PCRF 122.1 and a second PCRF 122.2. PCRFs 122.1-122.2 are shown in the embodiment of FIG. 2 to illustrate example interactions and operations that can be associated with sending aggregate RUCI to multiple PCRFs. For the embodiment of FIG. 2, it is assumed that PCRF 122.1 serves sessions associated with $APN_1$, as shown in FIG. 1, and PCRF 122.2 serves sessions associated with $APN_2$, as shown in FIG. 1. Further for the embodiment of FIG. 2, it is assumed that UE 102a, 102c, 102f and 102g are connected to $APN_1$ and UE 102b, 102d and 102e are connected to $APN_2$, as shown in FIG. 1.

Beginning at 202, it is assumed that RAN OAM system 108 sends RCAF 110 a load report including a cell-ID identifying cell 104a and a congestion level for cell 104a and a cell-ID identifying cell 104b and a congestion level for cell 104b. At 204, RCAF 110 initiates an Nq information request with MME 112 to request a list of identities of UEs in cell 104a and an APN to which each UE is connected and a list of identities of UEs in cell 104b and an APN to which each UE is connected. At 206, MME 112 responds with a list of UEs in cell 104a such that each UE is identified by their associated IMSI and the APN to which each UE is attached and a list of UEs in cell 104b such that each UE is identified by their associated IMSI and the APN to which each UE is attached.

At 208, RCAF 110 identifies, based on their IMSIs, which UEs are connected to which APNs (e.g., $APN_1$, $APN_2$) for each cell 104a, 104b. At 208, RCAF 110 also identifies which PCRF 122.1, 122.2 serves each $APN_1$ and $APN_2$. As noted above, it is assumed for the embodiment of FIG. 2 that PCRF 122.1 serves $APN_1$ and PCRF 122.2 serves $APN_2$; thus, RCAF 110 identifies each PCRF 122.2, 122.2 accordingly for the embodiment of FIG. 2. For the embodiment of FIG. 2, it is assumed that RCAF 110 is either configured with or retrieves the PCRF-APN configuration information that contains the association of each PCRF to each APN.

At 210, RCAF 110 generates and sends PCRF 122.1 an Np ARR command including, among other information as illustrated above in TABLES 1-4: one Aggregated-RUCI-Report AVP instance identifying the cell-ID for cell 104a, the congestion level of cell 104a and the group of UE in cell 104a connected to $APN_1$ (e.g., UE 102a and 102c) such that each UE is identified by its corresponding IMSI; and another Aggregated-RUCI-Report AVP instance identifying the cell-ID for cell 104b, the congestion level of cell 104b and the group of UE in cell 104b connected to $APN_1$ (e.g., UE 102f and 102g) such that each UE is identified by its corresponding IMSI.

At 212, RCAF 110 generates and sends PCRF 122.2 an Np ARR command including, among other information as illustrated above in TABLES 1-4: one Aggregated-RUCI-Report AVP instance identifying the cell-ID for cell 104a, the congestion level of cell 104a and the group of UE in cell 104a connected to $APN_2$ (e.g., UE 102b) such that each UE is identified by its corresponding IMSI; and another Aggregated-RUCI-Report AVP instance identifying the cell-ID for cell 104b, the congestion level of cell 104b and the group of UE in cell 104b connected to $APN_2$ (e.g., UE 102e and 102f) such that each UE is identified by its corresponding IMSI. Although the operations at 210 and 212 are shown as being performed in a serial manner, it should be understood that the operations can, in various embodiments, be performed in parallel or in series and, if performed in series, the RCAF can determine the order for sending aggregate RUCI among multiple PCRFs.

Thus, for embodiments in which there is no DRA in communication system 100, RCAF 110 can directly send each PCRF(s) (e.g., PCRF 122.1, 122.2) aggregated RUCI for a group of UE connected to each APN(s) served by each PCRF(s) for each cell(s) within RAN 106.

Figure 3:
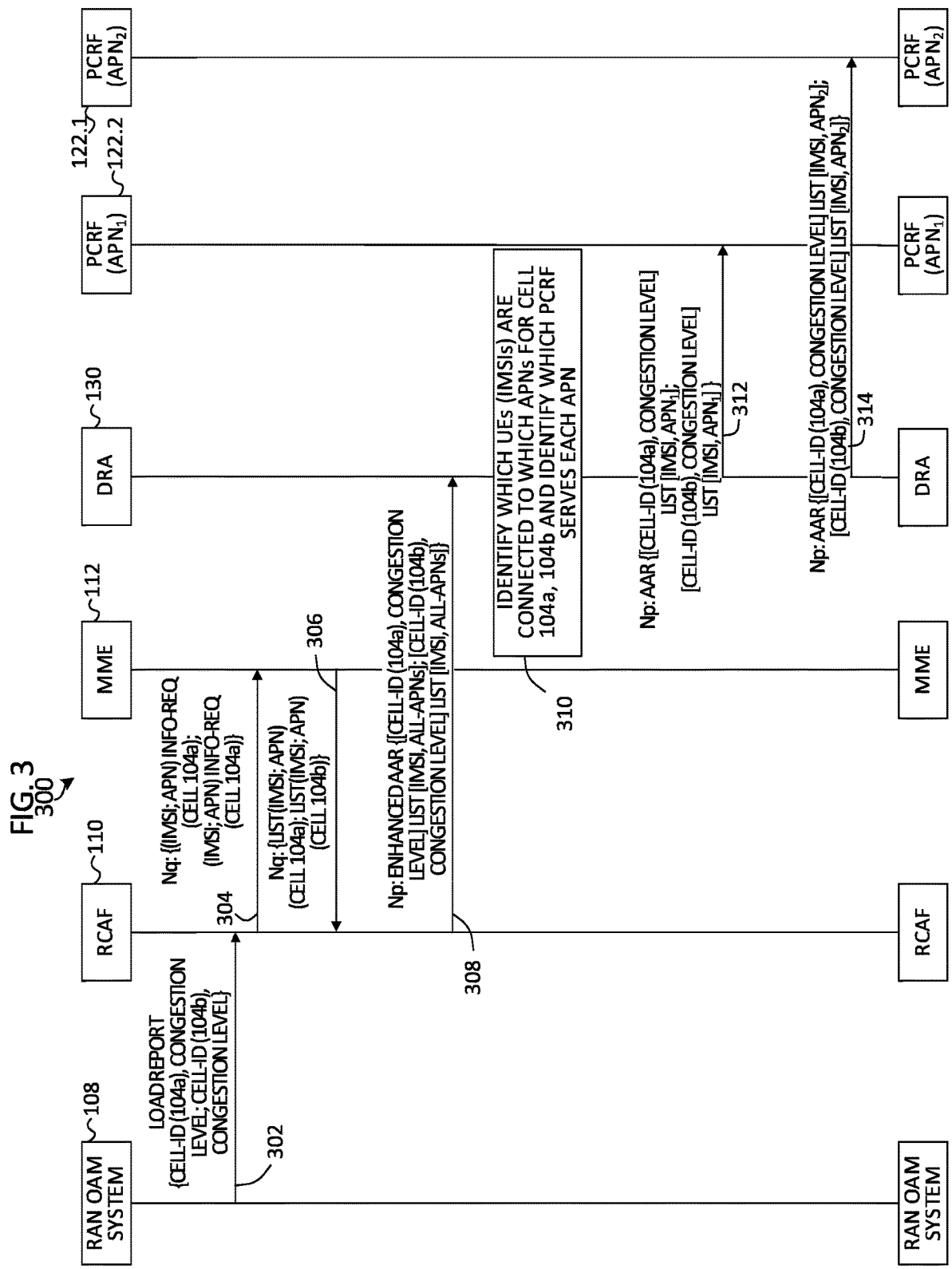
FIG. 3 is a simplified interaction diagram illustrating other example interactions and operations that can be associated with group reporting of user equipment congestion information in accordance with one potential embodiment of the communication system.

Referring to FIG. 3, FIG. 3 is a simplified interaction diagram 300 illustrating example interactions and operations that can be associated with group reporting of user equipment congestion information in accordance with one potential embodiment of communication system 100. In particular, the embodiment shown in FIG. 3 can be associated with a configuration of communication system 100 in which DRA 130 is provisioned in the communication system. FIG.

3 includes RAN OAM system 108, RCAF 110, MME 112, DRA 130, a first PCRF 122.1 and a second PCRF 122.2. For the embodiment of FIG. 3, it is assumed that PCRF 122.1 serves sessions associated with $APN_1$, as shown in FIG. 1, and PCRF 122.2 serves sessions associated with $APN_2$, as shown in FIG. 1. Further for the embodiment of FIG. 3, it is assumed that UE 102a, 102c, 102f and 102g are connected to $APN_1$ and UE 102b, 102d and 102e are connected to $APN_2$, as shown in FIG. 1. Further for the embodiment of FIG. 3, it is assumed that DRA 130 is provided PCRF and APN Gx session binding information for each IMSI/UE Gx session in order to relay signaling between the RCAF 110 and PCRFs 122.1, 122.2 servicing sessions of respective APNs $APN_1$, $APN_2$ for corresponding active PDN connections of the UEs in cell 104a, and 104b.

For the embodiment of FIG. 3, interactions 302-306 can be the same as discussed above for 202-206 in which the RAN OAM system 108 sends load information to RCAF 110 for each cell 104a, 104b and the RCAF 110 interacts with MME 112 to retrieve IMSI and APN information for the UE in each cell.

At 308, RCAF 110 generates and sends DRA 130 an enhanced Np ARR command including, among other information as illustrated above in TABLES 3-6: one Aggregated-All-APN-List-RUCI-Report AVP instance identifying the cell-ID for cell 104a, the congestion level of cell 104a and a list of UE in cell 104a (e.g., UE 102a-102c) for all APNs to which the UE are connected such that each UE is identified by its corresponding IMSI; and another Aggregated-All-APN-List-RUCI-Report AVP instance identifying the cell-ID for cell 104b, the congestion level of cell 104b and a list of UE in cell 104b (e.g., UE 102d-102g) for all APNs to which the UE are connected such that each UE is identified by its corresponding IMSI. Each Aggregated-All-APN-List-RUCI-Report AVP instance for the enhanced Np ARR command can include a Called-Station-Id AVP that is set to identify that the UE in each cell are connected to $APN_1$ and $APN_2$.

At 310, DRA 130 identifies, based on their IMSIs, which UEs are connected to which APNs (e.g., $APN_1$, $APN_2$) for cell 104a and cell 104b and which PCRF 122.1, 122.2 serves each $APN_1$ and $APN_2$. At 312, DRA 130 generates and sends PCRF 122.1 an Np ARR command including, among other information as illustrated above in TABLES 1-4: one Aggregated-RUCI-Report AVP instance identifying the cell-ID for cell 104a, the congestion level of cell 104a and the group of UE in cell 104a connected to $APN_1$ (e.g., UE 102a and 102c) such that each UE is identified by its corresponding IMSI; and another Aggregated-RUCI-Report AVP instance identifying the cell-ID for cell 104b, the congestion level of cell 104b and the group of UE in cell 104b connected to $APN_1$ (e.g., UE 102f and 102g) such that each UE is identified by its corresponding IMSI.

At 314, DRA 130 generates and sends PCRF 122.2 an Np ARR command including, among other information as illustrated above in TABLES 1-4: one Aggregated-RUCI-Report AVP instance identifying the cell-ID for cell 104a, the congestion level of cell 104a and the group of UE in cell 104a connected to $APN_2$ (e.g., UE 102b) such that each UE is identified by its corresponding IMSI; and another Aggregated-RUCI-Report AVP instance identifying the cell-ID for cell 104b, the congestion level of cell 104b and the group of UE in cell 104b connected to $APN_2$ (e.g., UE 102d and UE 102e) such that each UE is identified by its corresponding IMSI.

Although the operations at 312 and 314 are shown as being performed in a serial manner, it should be understood that the operations can, in various embodiments, be performed in parallel or in series and, if performed in series, the RCAF can determine the order for sending aggregate RUCI among multiple PCRFs.

Thus, for embodiments in which there is a DRA in communication system 100, RCAF 110 can indirectly send, via the DRA, each PCRF(s) (e.g., PCRF 122.1, 122.2) aggregated RUCI for group(s) of UEs connected to each APN(s) served by each PCRF(s) for each cell(s) within RAN 106.

Figure 4:
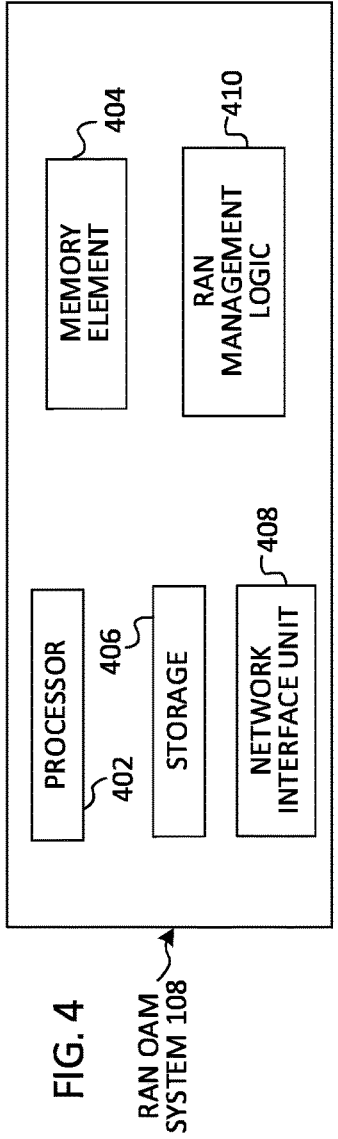
FIGS. 4-6 are simplified block diagrams illustrating additional example details that can be associated with various potential embodiments of the communication system.

Referring to FIG. 4, FIG. 4 is a simplified block diagram illustrating example details that can be associated with RAN OAM system 108 in accordance with one potential embodiment of communication system 100. RAN OAM system 108 can include at least one processor 402, at least one memory element 404, a storage 406, a network interface unit 408 and RAN management logic 410.

In at least one embodiment, at least one processor 402 is at least one hardware processor configured to execute various tasks, operations and/or functions of RAN OAM system 108 as described herein. At least one memory element 404 and/or storage 406 can be configured to store data, information, software and/or instructions associated with the RAN OAM system 108. In various embodiments, at least one memory element 404 and/or storage 406 can be configured to store: configuration information for RAN 106, radio interface equipment information for RAN 106, load reporting information for each cell 104a-104b in RAN 106, any other data, information, software and/or instructions as discussed for various embodiments described herein; combinations thereof or the like.

In various embodiments, network interface unit 408 enables communication between the RAN OAM system 108, radio interface equipment in RAN 106 and RCAF 110 for various deployments. In some embodiments, network interface unit 408 can be configured with one or more Ethernet driver(s) and/or controller(s) or other similar network interface driver(s) and/or controller(s) to enable communications for the RAN OAM system 108.

In at various embodiments, RAN management logic 410 can include instructions that, when executed (e.g., by at least one processor 402), cause RAN OAM system 108 to perform, one or more operations discussed herein including, but not limited to: monitoring and/or detecting congestion in each one or more cell(s) (e.g., cells 104a-104b); sending per-cell congestion information to RCAF 110 via one or more load reports for one or more cell(s); combinations thereof or any other operations described for various embodiments discussed herein.

Figure 5:
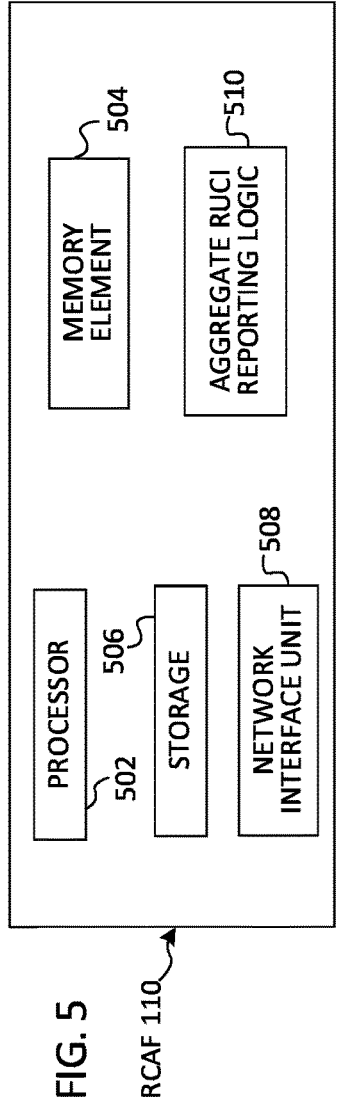

Referring to FIG. 5, FIG. 5 is a simplified block diagram illustrating example details that can be associated with RCAF 110 in accordance with one potential embodiment of communication system 100. RCAF 110 can include at least one processor 502, at least one memory element 504, a storage 506, a network interface unit 508 and aggregate RUCI reporting logic 510.

In at least one embodiment, at least one processor 502 is at least one hardware processor configured to execute various tasks, operations and/or functions of RCAF 110 as described herein. At least one memory element 504 and/or storage 506 can be configured to store data, information, software and/or instructions associated with the RCAF 110. In various embodiments, at least one memory element 504 and/or storage 506 can be configured to store: PCRF-APN configuration information; AVP configuration information (e.g., for receiving and handling load reports from RAN OAM system 108, generating Np ARR commands, generating enhanced Np ARR commands, etc.); cell load reports for cells 104a-104b; any other data, information, software and/or instructions as discussed for various embodiments described herein; combinations thereof or the like.

In various embodiments, network interface unit 508 enables communication between RCAF 110, RAN OAM system 108, one or more PCRF(s) 122 (e.g., for embodiments in which no DRA is provisioned in communication system 100), DRA 130 (e.g., for embodiments in which DRA 130 is provisioned in communication system 100), MME 112 and/or external databases or repositories (e.g., for collecting PCRF-APN configuration information) for various deployments. In some embodiments, network interface unit 508 can be configured with one or more Ethernet driver(s) and/or controller(s) or other similar network interface driver(s) and/or controller(s) to enable communications for the RCAF 110.

In various embodiments, aggregate RUCI reporting logic 510 can include instructions that, when executed (e.g., by at least one processor 502), cause RCAF 110 to perform, one or more operations discussed herein including, but not limited to: receiving and processing load information (e.g., load reports) from RAN OAM system 108; storing and/or retrieving PCRF-APN configuration information; exchanging communications with MME 112 via Nq/Nq' interactions with the MME; identifying one or more group(s) of UE in one or more cell(s) connected to each of one or more APN(s), identifying PCRF(s) serving the APN(s) and generating and sending standard Np ARR commands to each of the PCRF(s) (e.g., for embodiments in which no DRA is provisioned in communication system 100) for the one or more cell(s) having UE connected to the APN(s) served by each respective PCRF(s); generating and sending enhanced Np ARR commands to DRA 130 including a list of all APN(s) to which UE in one or more cell(s) are connected (e.g., for embodiments in which DRA 130 is provisioned in communication system 100); combinations thereof or any other operations described for various embodiments discussed herein.

Figure 6:
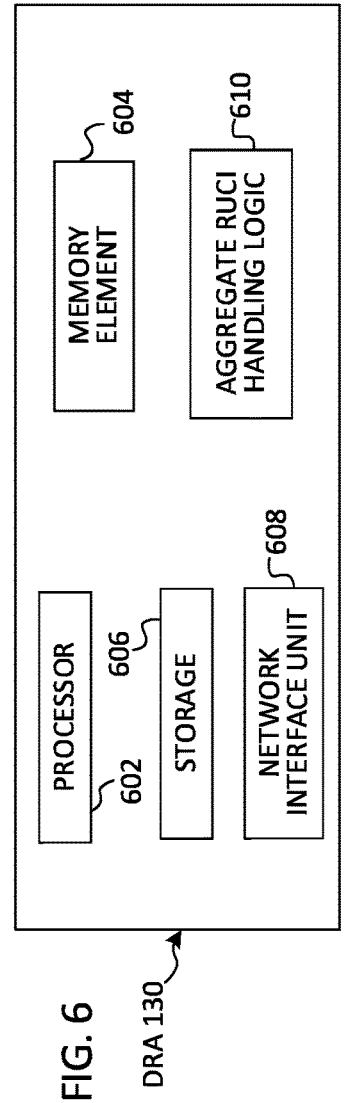

Referring to FIG. 6, FIG. 6 is a simplified block diagram illustrating example details that can be associated with DRA 130 in accordance with one potential embodiment of communication system 100. DRA 130 can include at least one processor 602, at least one memory element 604, a storage 606, a network interface unit 608 and aggregate RUCI handling logic 610.

In at least one embodiment, at least one processor 602 is at least one hardware processor configured to execute various tasks, operations and/or functions of DRA 130 as described herein. At least one memory element 604 and/or storage 606 can be configured to store data, information, software and/or instructions associated with the DRA 130. In various embodiments, at least one memory element 604 and/or storage 606 can be configured to store: PCRF-APN configuration information; PCRF and APN Gx session binding information for various IMSI/UE Gx sessions; AVP configuration information (e.g., for receiving and handling enhanced Np ARR commands from RCAF 110 and generating standard Np ARR commands to PCRF(s) for one or more APN(s)); any other data, information, software and/or instructions as discussed for various embodiments described herein; combinations thereof or the like.

In various embodiments, network interface unit 608 enables communication between DRA 130, RCAF 110, one or more PCRF(s) 122, PGW 116/PCEF 118 and TDF 120 for various deployments. In some embodiments, network interface unit 608 can be configured with one or more Ethernet driver(s) and/or controller(s) or other similar network interface driver(s) and/or controller(s) to enable communications for the DRA 130.

In various embodiments, aggregate RUCI handling logic 610 can include instructions that, when executed (e.g., by at least one processor 602), cause DRA 130 to perform, one or more operations discussed herein including, but not limited to: receiving and processing enhanced Np ARR commands from RCAF 110; identifying one or more group(s) of UE in one or more cell(s) connected to each of one or more APN(s), identifying the PCRF(s) serving the APN(s) and generating and sending standard Np ARR commands to each of the PCRF(s) for the one or more cell(s) having UE connected to the APN(s) served by each respective PCRF(s); combinations thereof or any other operations described for various embodiments discussed herein.

In regards to the internal structure associated with communication system 100 described herein, UE 102a-102g, MME 112, PCRF(s) 122 (e.g., PCRF 122.1, PCRF 122.2), SGW 114, PGW 116/PCEF 118, TDF 120 and AF 124 can also be configured to include a respective at least one processor, a respective at least one memory element and/or a respective storage in accordance with various embodiments. Hence, appropriate software, hardware and/or algorithms are being provisioned for communication system 100 in order to facilitate operations as described for various embodiments discussed herein to facilitate group reporting of user equipment congestion information in a network environment.

In one example implementation, UE 102a-102g, RAN OAM system 108, RCAF 110, DRA 130, MME 112, PCRF(s) 122 (e.g., PCRF 122.1, PCRF 122.2), SGW 114, PGW 116/PCEF 118, TDF 120 and AF 124 discussed for various embodiments described herein can encompass network appliances, routers, servers, switches, gateways, bridges, loadbalancers, firewalls, processors, modules, or any other suitable device, component, element, or object operable to exchange information that facilitates or otherwise helps to facilitate various operations as described for various embodiments discussed herein in a network environment (e.g., for networks such as those illustrated in FIG. 1). Alternatively, one or more of UE 102a-102g, RAN OAM system 108, RCAF 110, DRA 130, MME 112, PCRF(s) 122 (e.g., PCRF 122.1, PCRF 122.2), SGW 114, PGW 116/PCEF 118, TDF 120 and AF 124 discussed herein can include software (or reciprocating software) that can coordinate in order to achieve operations associated with providing group reporting of user equipment congestion information in a network environment, as outlined herein. In still other embodiments, one or more of UE 102a-102g, RAN OAM system 108, RCAF 110, DRA 130, MME 112, PCRF(s) 122 (e.g., PCRF 122.1, PCRF 122.2), SGW 114, PGW 116/PCEF 118, TDF 120 and AF 124 discussed herein may include any suitable algorithms, hardware, software, components, modules, clients, interfaces, and/or objects that facilitate the operations thereof. This may be inclusive of appropriate algorithms, communication protocols, interfaces and/or standards, proprietary and/or non-proprietary that allow for the effective exchange of data or information.

In various embodiments, UE 102a-102g, RAN OAM system 108, RCAF 110, DRA 130, MME 112, PCRF(s) 122 (e.g., PCRF 122.1, PCRF 122.2), SGW 114, PGW 116/PCEF 118, TDF 120 and AF 124 discussed herein may keep information in any suitable memory element [e.g., random access memory (RAM), read only memory (ROM), an erasable programmable read only memory (EPROM), application specific integrated circuit (ASIC), etc.], software, hardware, or in any other suitable component, device, element, and/or object where appropriate and based on particular needs. Any of the memory items discussed herein should be construed as being encompassed within the broad term 'memory element'. Information being tracked or sent to UE 102a-102g, RAN OAM system 108, RCAF 110, DRA 130, MME 112, PCRF(s) 122 (e.g., PCRF 122.1, PCRF 122.2), SGW 114, PGW 116/PCEF 118, TDF 120 and AF 124 discussed herein could be provided in any database, register, control list, cache, storage and/or storage structure: all of which can be referenced at any suitable timeframe. Any such storage options may be included within the broad term 'memory element' as used herein. Similarly, any of the potential processing elements, controllers, managers, logic and/or machines described herein should be construed as being encompassed within the broad term 'processor'. Each of UE 102a-102g, RAN OAM system 108, RCAF 110, DRA 130, MME 112, PCRF(s) 122 (e.g., PCRF 122.1, PCRF 122.2), SGW 114, PGW 116/PCEF 118, TDF 120 and AF 124 network discussed herein can also include suitable interfaces for receiving, transmitting, and/or otherwise communicating data or information in a network environment.

Note that in certain example implementations, operations as outlined herein to facilitate group reporting of user equipment congestion information may be implemented by logic encoded in one or more tangible media, which may be inclusive of non-transitory tangible media and/or non-transitory computer readable storage media (e.g., embedded logic provided in an ASIC, in digital signal processing (DSP) instructions, software [potentially inclusive of object code and source code] to be executed by a processor, or other similar machine, etc.). In some of these instances, a memory element and/or storage [as shown in FIGS. 4-6] can store data, software, code, instructions (e.g., processor instructions), logic, parameters, combinations thereof or the like used for operations described herein. This includes memory elements and/or storage being able to store data, software, code, instructions (e.g., processor instructions), logic, parameters, combinations thereof or the like that are executed to carry out operations described herein. A processor (e.g., a hardware processor) can execute any type of instructions associated with data to achieve the operations detailed herein. In one example, a processor [as shown in FIGS. 4-6] could transform an element or an article (e.g., data, information) from one state or thing to another state or thing. In another example, operations outlined herein may be implemented with logic, which can include fixed logic, hardware logic, programmable logic, digital logic, etc. (e.g., software/computer instructions executed by a processor) and/or one or more the elements identified herein could be some type of a programmable processor, programmable digital logic (e.g., a field programmable gate array (FPGA), a DSP processor, an EPROM, a controller, an electrically erasable PROM (EEPROM) or an ASIC that includes digital logic, software, code, electronic instructions, or any suitable combination thereof.

Each of UE 102a-102g, RAN OAM system 108, RCAF 110, DRA 130, MME 112, PCRF(s) 122 (e.g., PCRF 122.1, PCRF 122.2), SGW 114, PGW 116/PCEF 118, TDF 120 and AF 124 discussed for various embodiments described herein can couple to one another through simple interfaces (as illustrated) or through any other suitable connection (wired or wireless), which provides a viable pathway for network communications. Additionally, any one or more of UE 102a-102g, RAN OAM system 108, RCAF 110, DRA 130, MME 112, PCRF(s) 122 (e.g., PCRF 122.1, PCRF 122.2), SGW 114, PGW 116/PCEF 118, TDF 120 and AF 124 discussed herein may be combined or removed from a given deployment based on particular configuration needs. Communications in a network environment are referred to herein as 'messages', 'messaging' and/or 'signaling', which may be inclusive of communications using packets.

Note that in this Specification, references to various features (e.g., elements, structures, nodes, modules, components, logic, steps, operations, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein this Specification, can be inclusive of an executable file comprising instructions that can be understood and processed on a computer, processor, combinations thereof or the like and may further include library modules loaded during execution, object files, system files, hardware logic, software logic, or any other executable modules.

It is also important to note that the operations and steps described with reference to the preceding FIGURES illustrate only some of the possible scenarios that may be executed by, or within, the communication system 100. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Note that with the examples provided above, as well as numerous other examples provided herein, interaction may be described in terms of one, two, three, or four network elements. However, this has been done for purposes of clarity and example only. In certain cases, it may be easier to describe one or more of the functionalities by only referencing a limited number of network elements. It should be appreciated that communication system 100 (and its teachings) are readily scalable and can accommodate a large number of components, as well as more complicated/sophisticated arrangements and configurations. Accordingly, the examples provided should not limit the scope or inhibit the broad teachings of communication system 100 as potentially applied to a myriad of other architectures.

As used herein, unless expressly stated to the contrary, use of the phrase 'at least one of', 'one or more of' and 'and/or' are open ended expressions that are both conjunctive and disjunctive in operation for any combination of named elements, conditions, or activities. For example, each of the expressions 'at least one of X, Y and Z', 'at least one of X, Y or Z', 'one or more of X, Y and Z', 'one or more of X, Y or Z' and 'A, B and/or C' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z. Additionally, unless expressly stated to the contrary, the terms 'first', 'second', 'third', etc., are intended to distinguish the particular nouns (e.g., element, condition, module, activity, operation, etc.) they modify. Unless expressly stated to the contrary, the use of these terms is not intended to indicate any type of order, rank, importance, temporal sequence, or hierarchy of the modified noun. For example, 'first X' and 'second X' are intended to designate two X elements that are not necessarily limited by any order, rank, importance, temporal sequence, or hierarchy of the two elements. As referred to herein, 'at least one of' and 'one or more of' can be represented using the '(s)' nomenclature (e.g., one or more element(s)).

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access, interfaces and protocols, communication system 100 may be applicable to other exchanges or routing protocols, interfaces and/or communications standards, proprietary and/or non-proprietary. Moreover, although communication system 100 has been illustrated with reference to particular elements and operations that facilitate the communication process, these elements, and operations may be replaced by any suitable architecture or process that achieves the intended functionality of communication system 100.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph (f) of 35 U.S.C. Section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

In view of the foregoing, the scope of the present disclosure is determined by the claims that follow.

We claim:

1. A method comprising:
   receiving load information for a plurality of cells of a Radio Access Network (RAN), wherein the load information comprises an identity for each cell of the plurality of cells and a corresponding congestion level for each cell of the plurality of cells;
   determining, for each of a plurality of user equipment (UE) in each cell, identification information for each UE and an Access Point Name (APN) to which each UE is connected;
   identifying, from a plurality of policy servers, each policy server that serves each APN to which each UE in each cell of the plurality of cells is connected;
   sending, to each identified policy server, congestion information comprising:
      an identity for each of one or more cells having UE that are connected to each of one or more APN served by the particular policy server;
      the corresponding congestion level for each of the one or more cells; and
      a per-cell UE list identifying each of a plurality of UE connected to each of the one or more APN served by the particular policy server, wherein each identified policy server is configured to determine a congestion status for each UE connected to each APN based, at least in part, on the congestion information received by the respective policy server; and
   sending, by a RAN Congestion Awareness Function (RCAF) communicatively coupled to the plurality of cells, a plurality of Attribute Value Pairs (AVPs) relating to the congestion information to a Diameter Routing Agent (DRA) in one message, wherein each AVP is associated with a respective cell of the plurality of cells.

2. The method of claim 1, wherein the identifying and the sending are performed by the RCAF and the first network device comprises the RCAF.

3. The method of claim 2, wherein the identifying performed by the RCAF is based on configuration information stored at the RCAF that identifies each policy server that serves each APN.

4. The method of claim 2, wherein the identifying performed by the RCAF is based on configuration information provided to the RCAF from an external database that identifies each policy server that serves each APN.

5. The method of claim 1, wherein the plurality of AVPs comprise: a particular identity for a particular cell, a particular congestion level of the particular cell, a first list indicating each APN to which each UE in the particular cell is connected, and a second list indicating each of the plurality of UE in the particular cell.

6. The method of claim 1, wherein at least one of the policy servers is a Policy and Charging Rules Function (PCRF).

7. The method of claim 1, wherein an efficiency of the sending increases in proportion to an increase in UE in each cell of the plurality of cells.

8. One or more non-transitory tangible media encoding logic that includes instructions for execution that when executed by a processor, is operable to perform operations comprising:
   receiving load information for a plurality of cells of a Radio Access Network (RAN), wherein the load information comprises an identity for each cell of the plurality of cells and a corresponding congestion level for each cell of the plurality of cells;
   determining, for each of a plurality of user equipment (UE) in each cell, identification information for each UE and an Access Point Name (APN) to which each UE is connected;
   identifying, from a plurality of policy servers, each policy server that serves each APN to which each UE in each cell of the plurality of cells is connected;
   sending, to each identified policy server, congestion information comprising:
      an identity for each of one or more cells having UE that are connected to each of one or more APN served by the particular policy server;
      the corresponding congestion level for each of the one or more cells; and
      a per-cell UE list identifying each of a plurality of UE connected to each of the one or more APN served by the particular policy server, wherein the identifying and the sending are performed by a Diameter Routing Agent (DRA); and
   sending, by a RAN Congestion Awareness Function (RCAF) communicatively coupled to the plurality of cells, a plurality of Attribute Value Pairs (AVPs) relating to the congestion information to a Diameter Routing Agent (DRA) in one message, wherein each AVP is associated with a respective cell of the plurality of cells.

9. The media of claim 8, the operations further comprising:
  determining, by each identified policy server, a congestion status for each UE connected to each APN based, at least in part, on the congestion information received by each identified policy server.

10. The media of claim 8, wherein the plurality of AVPs comprise: a particular identity for a particular cell, a particular congestion level of the particular cell, a first list indicating each APN to which each UE in the particular cell is connected, and a second list indicating each of the plurality of UE in the particular cell.

11. The media of claim 8, wherein an efficiency of the sending increases in proportion to an increase in UE in each cell of the plurality of cells.

12. The media of claim 8, wherein each identified policy server is configured to determine a congestion status for each UE connected to each APN based, at least in part, on the congestion information received by the respective policy server.

13. A communication system comprising:
  a Radio Access Network (RAN) Congestion Awareness Function (RCAF) comprising at least one first memory element for storing first data and at least one first processor that executes instructions associated with the first data;
  the RCAF being adapted when executed by the at least one first processor to:
    receive load information for a plurality of cells of a Radio Access Network (RAN), wherein the load information comprises an identity for each cell of the plurality of cells and a corresponding congestion level for each cell of the plurality of cells;
    determine, for each of a plurality of user equipment (UE) in each cell, identification information for each UE and an Access Point Name (APN) to which each UE is connected;
    identify, from a plurality of policy servers, each policy server that serves each APN to which each UE in each cell of the plurality of cells is connected;
    send, to each identified policy server, congestion information comprising:
      an identity for each of one or more cells having UE that are connected to each of one or more APN served by the particular policy server;
      the corresponding congestion level for each of the one or more cells; and
      a per-cell UE list identifying each of a plurality of UE connected to each of the one or more APN served by the particular policy server, wherein an efficiency of the sending increases in proportion to an increase in UE in each cell of the plurality of cells; and
    send, by the RCAF communicatively coupled to the plurality of cells, a plurality of Attribute Value Pairs (AVPs) relating to the congestion information to a Diameter Routing Agent (DRA) in one message, wherein each AVP is associated with a respective cell of the plurality of cells.

14. The communication system of claim 13, further comprising:
  the DRA comprising at least one second memory element for storing data and at least one second processor that executes instructions associated with the data; and
  the DRA being adapted when executed by the at least one second processor to:
    identify, from a plurality of policy servers, each policy server that serves each APN to which each UE in each cell of the plurality of cells is connected.

15. The communication system of claim 13, wherein each identified policy server is configured to determine a congestion status for each UE connected to each APN based, at least in part, on the congestion information received by the respective policy server.

* * * * *